United States Patent
Takayama

(10) Patent No.: US 12,403,976 B2
(45) Date of Patent: Sep. 2, 2025

(54) ELECTRICAL DEVICE AND ROTATIONAL DEVICE FOR HUMAN-POWERED VEHICLE

(71) Applicant: SHIMANO INC., Sakai (JP)

(72) Inventor: Hitoshi Takayama, Sakai (JP)

(73) Assignee: SHIMANO INC., Sakai (JP)

( * ) Notice: Subject to any disclaimer, the term of this patent is extended or adjusted under 35 U.S.C. 154(b) by 243 days.

(21) Appl. No.: 18/071,624

(22) Filed: Nov. 30, 2022

(65) Prior Publication Data
US 2024/0174315 A1    May 30, 2024

(51) Int. Cl.
| | |
|---|---|
| *B62J 45/421* | (2020.01) |
| *B62J 45/41* | (2020.01) |
| *B62M 3/16* | (2006.01) |
| *B62M 6/50* | (2010.01) |
| *B62J 45/40* | (2020.01) |
| *B62J 45/413* | (2020.01) |

(52) U.S. Cl.
CPC ............. *B62J 45/421* (2020.02); *B62J 45/41* (2020.02); *B62M 3/16* (2013.01); *B62M 6/50* (2013.01); *B62J 45/40* (2020.02); *B62J 45/413* (2020.02)

(58) Field of Classification Search
CPC . B62J 45/41; B62J 45/411; B62J 45/42; B62J 45/421; G01L 5/0028; G01L 5/0042
See application file for complete search history.

(56) References Cited

U.S. PATENT DOCUMENTS

| | | | | |
|---|---|---|---|---|
| 9,150,279 | B2 * | 10/2015 | Gros | B62J 45/421 |
| 9,581,508 | B2 * | 2/2017 | Tetsuka | B62J 45/412 |
| 10,060,738 | B2 * | 8/2018 | Fyfe | B62J 45/414 |
| 2019/0175986 | A1 * | 6/2019 | Golesh | A63B 21/4049 |
| 2021/0331761 | A1 * | 10/2021 | Fujimura | B62J 45/421 |
| 2024/0174314 | A1 | 5/2024 | Takayama et al. | |

FOREIGN PATENT DOCUMENTS

| | | |
|---|---|---|
| DE | 10 2022 126 942 | 5/2023 |
| DE | 10 2023 110 753 | 6/2024 |

* cited by examiner

*Primary Examiner* — Erika J. Villaluna
(74) *Attorney, Agent, or Firm* — MORI & WARD, LLP

(57) ABSTRACT

An electrical device for a rotational device of a human-powered vehicle comprises a housing and a force sensor. The housing includes an outer surface and an inner surface. The outer surface includes an attachment surface configured to be attached to an additional attachment surface of the rotational device with an adhesive agent. The inner surface defines an internal space. The force sensor is attached to the attachment surface and is configured to measure a force applied to the rotational device in an attachment state where the attachment surface is attached to the additional attachment surface of the rotational device.

20 Claims, 19 Drawing Sheets

FIG. 3
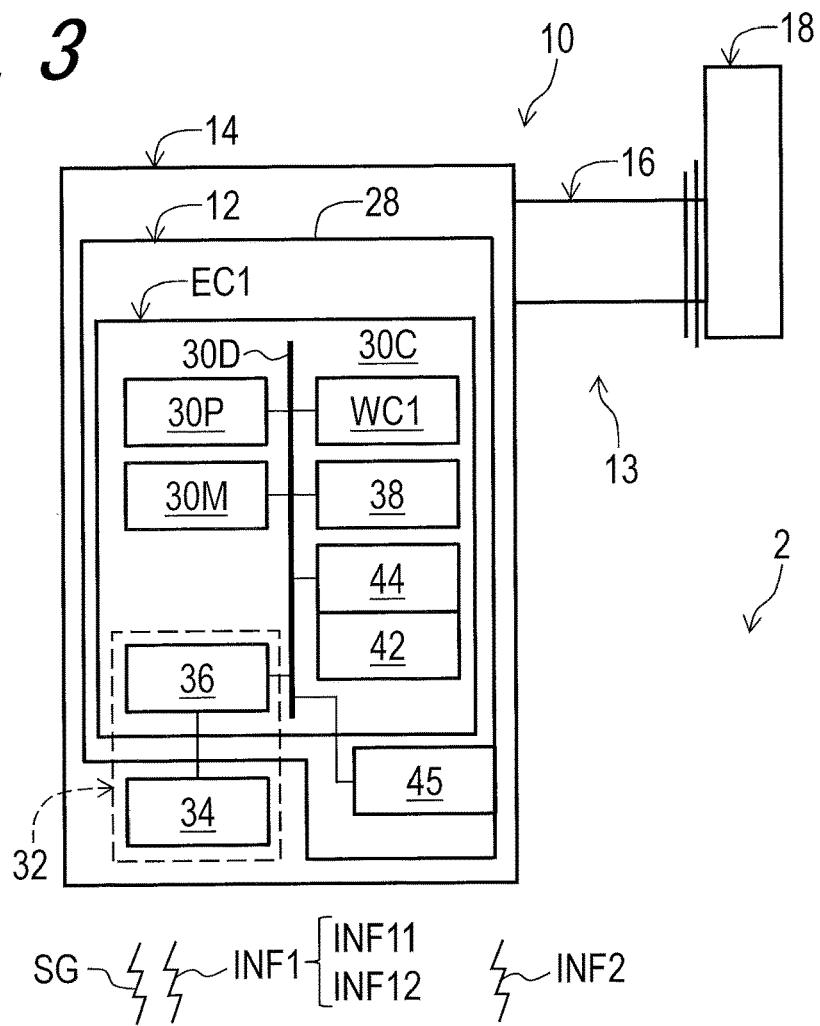
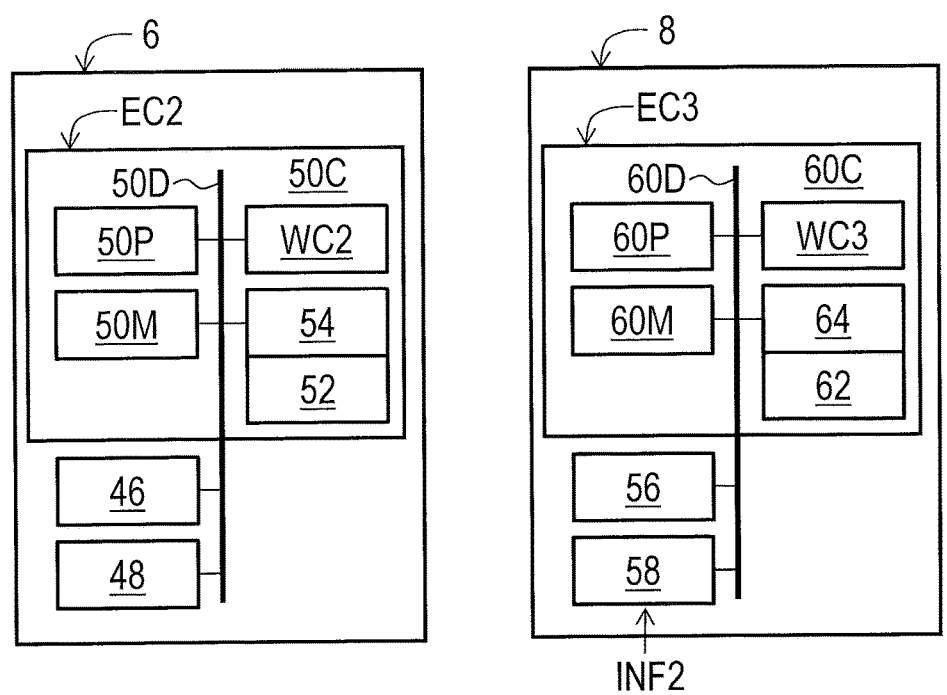

FIG. 8
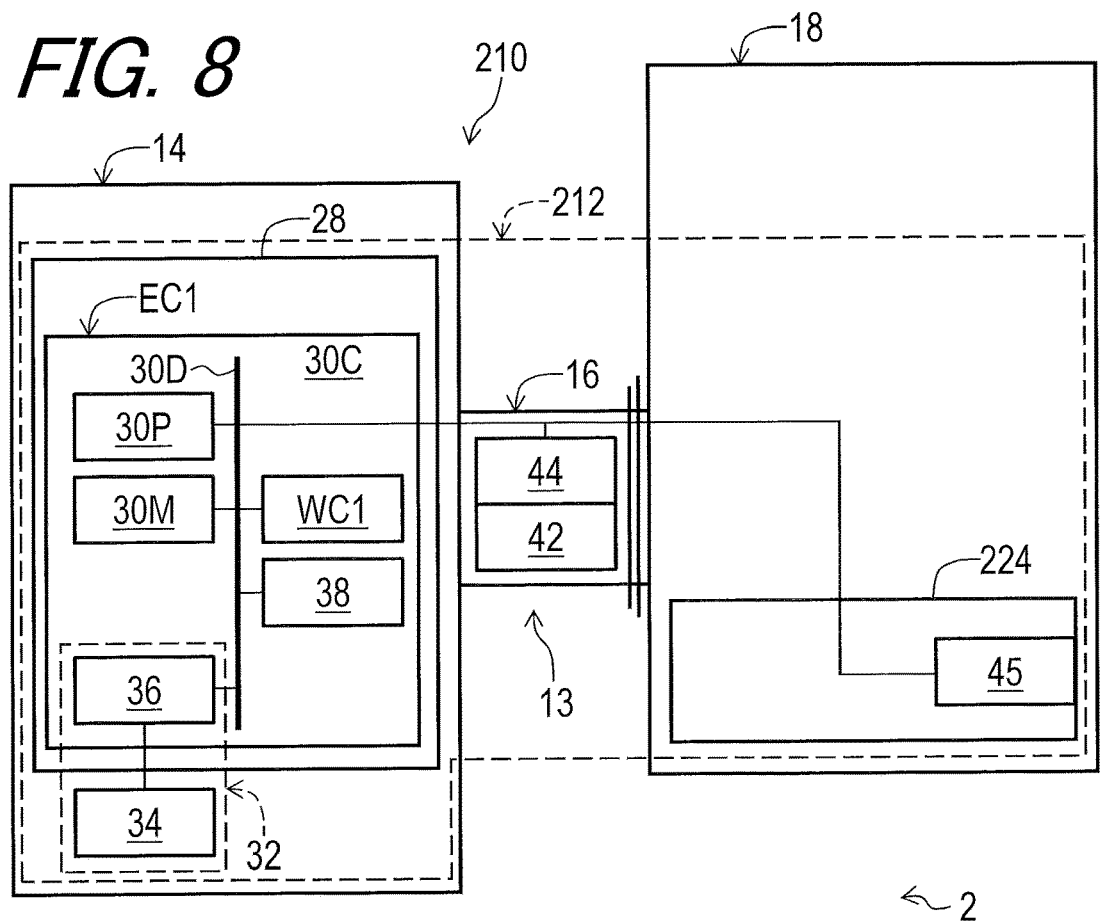
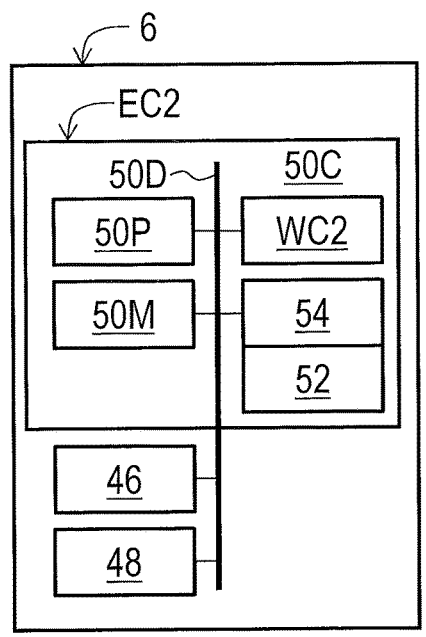
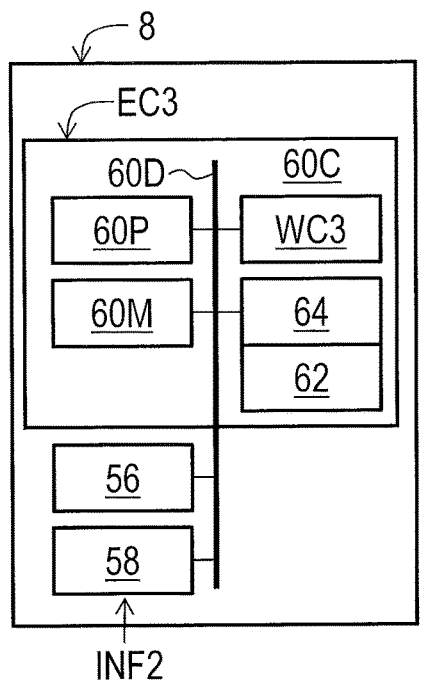

FIG. 12
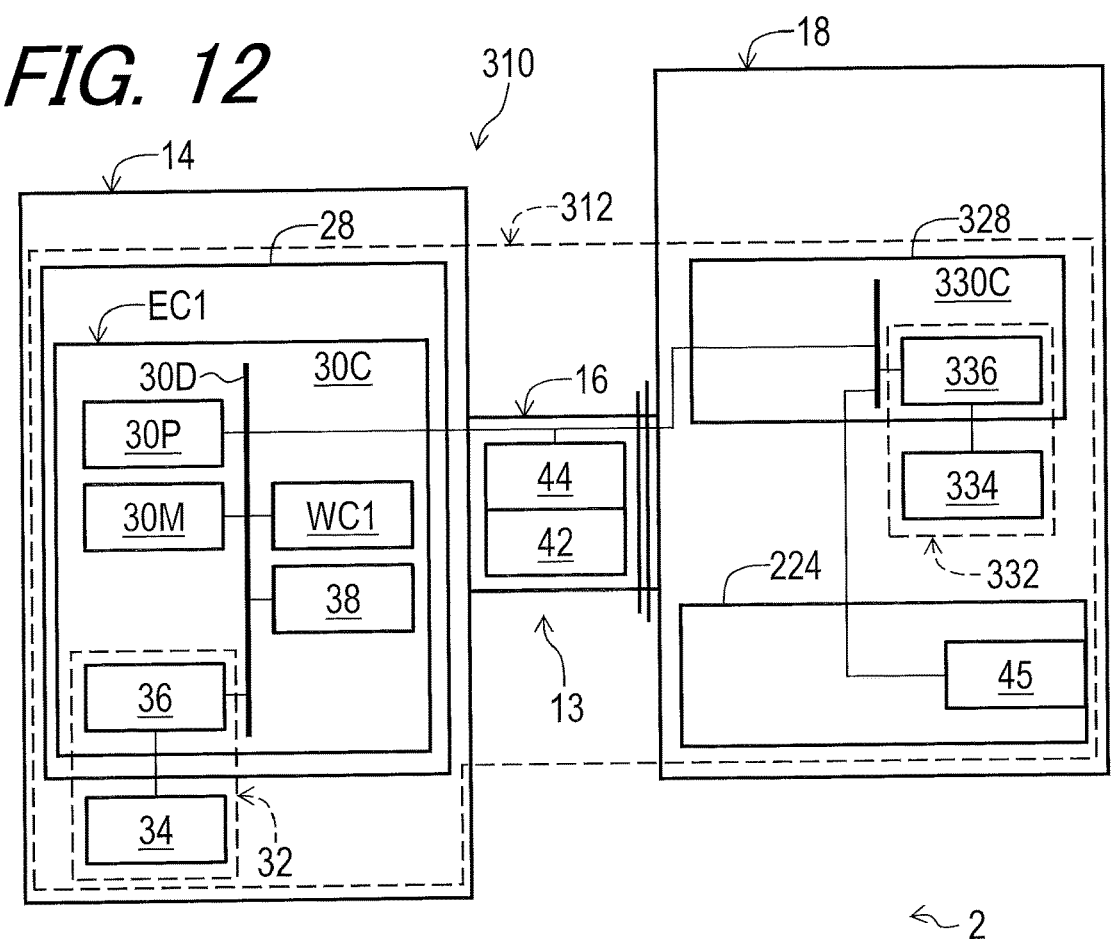
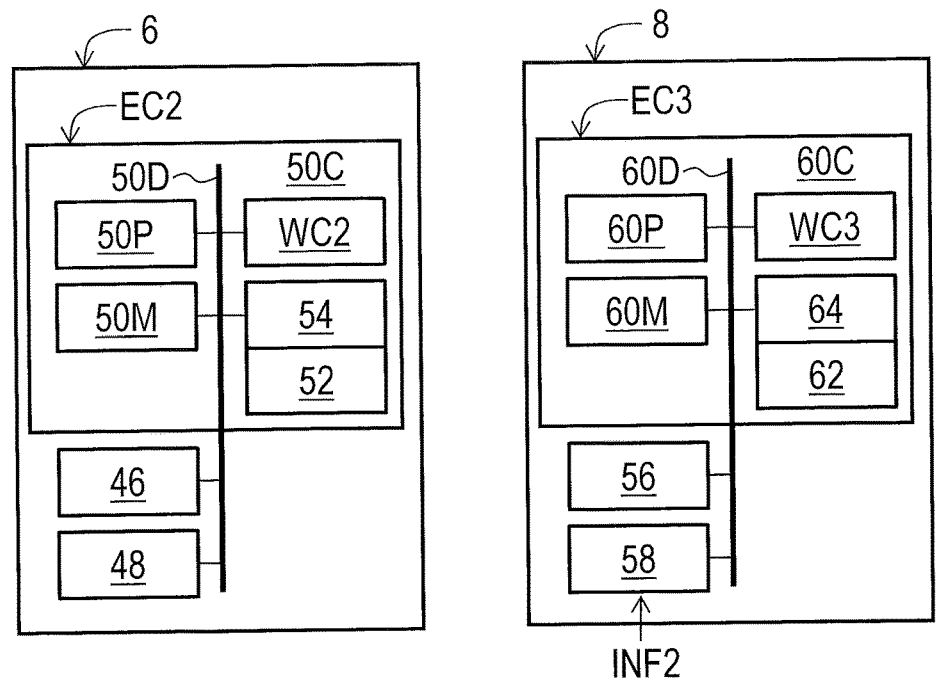

FIG. 18
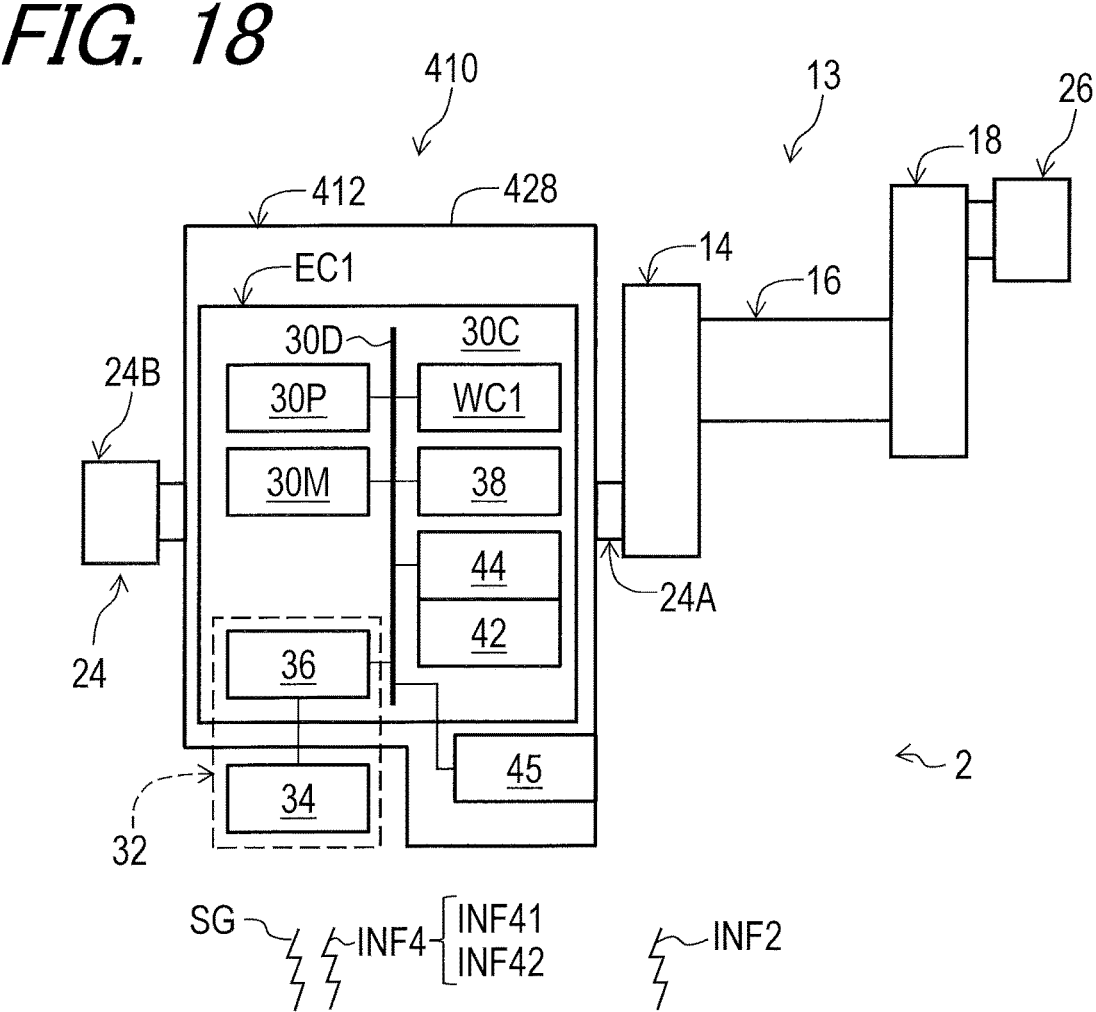
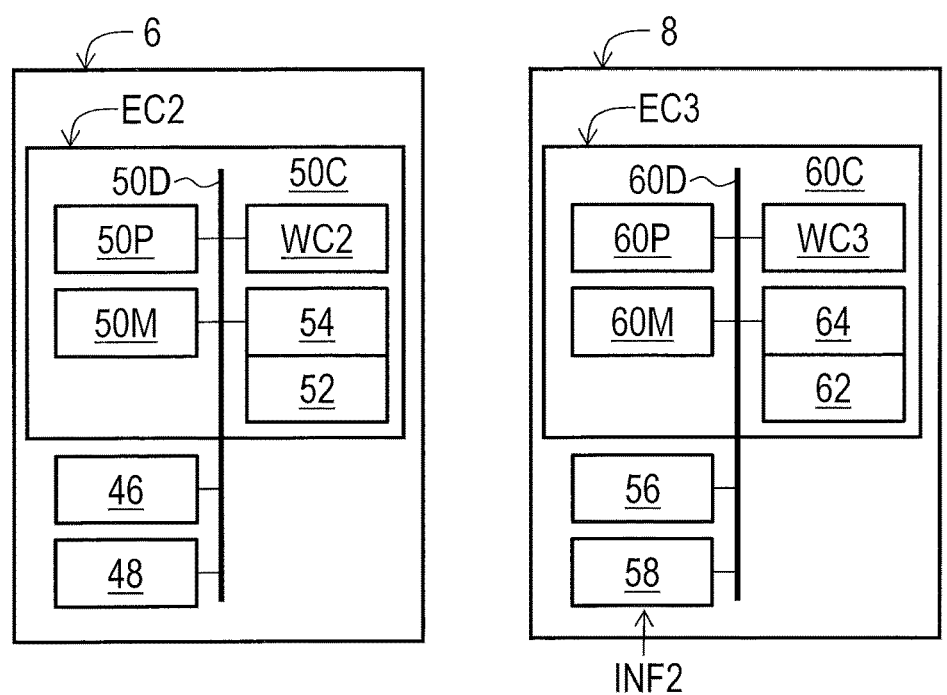

ELECTRICAL DEVICE AND ROTATIONAL DEVICE FOR HUMAN-POWERED VEHICLE

BACKGROUND

Technical Field

The present invention relates to an electrical device and a rotational device for a human-powered vehicle.

Background Information

A human-powered vehicle includes a device configured to rotate relative to a vehicle body. The device includes a sensor configured to sense a force applied to the device. A zero point of the sensor may vary due to use and/or deterioration. It is preferable to easily improve accuracy of a measurement value of the sensor.

SUMMARY

In accordance with a first aspect of the present invention, an electrical device for a rotational device of a human-powered vehicle comprises a housing and a force sensor. The housing includes an outer surface and an inner surface. The outer surface includes an attachment surface configured to be attached to an additional attachment surface of the rotational device with an adhesive agent. The inner surface defines an internal space. The force sensor is attached to the attachment surface and is configured to measure a force applied to the rotational device in an attachment state where the attachment surface is attached to the additional attachment surface of the rotational device.

With the electrical device according to the first aspect, the force sensor is attached to the attachment surface configured to be attached to the additional attachment surface of the rotational device with the adhesive agent. Thus, it is possible to attach the housing and the force sensor to the additional attachment surface as a single unit. Accordingly, it is possible to simplify a process of attaching the housing and the force sensor to the additional attachment surface.

In accordance with a second aspect of the present invention, the electrical device according to the first aspect is configured so that the force sensor is entirely provided outside the internal space.

With the electrical device according to the second aspect, it is possible to shorten a distance between the force sensor and the additional attachment surface of the rotational device. Thus, it is possible to improve measurement accuracy of the force sensor compared to a case where the force sensor is provided in the internal space.

In accordance with a third aspect of the present invention, the electrical device according to the first or second aspect is configured so that the housing includes a base plate at least partially defining the internal space. The base plate includes the attachment surface.

With the electrical device according to the third aspect, it is possible to define the attachment surface with a comparatively simple structure.

In accordance with a fourth aspect of the present invention, the electrical device according to the third aspect is configured so that the base plate partially defines the outer surface. The base plate partially defines the inner surface.

With the electrical device according to the fourth aspect, it is possible to define the outer surface and the inner surface with a comparatively simple structure.

In accordance with a fifth aspect of the present invention, the electrical device according to any one of the first to fourth aspects further comprises a position detector at least partially provided in the internal space. The position detector is configured to detect a rotational position of the rotational device.

With the electrical device according to the fifth aspect, it is possible to obtain the rotational position of the rotational device using the position detector.

In accordance with a sixth aspect of the present invention, the electrical device according to any one of the first to fifth aspects further comprises a wireless communicator at least partially provided in the internal space. The wireless communicator is configured to wirelessly communicate with an additional wireless communicator of an additional electric device.

With the electrical device according to the sixth aspect, it is possible to wirelessly communicate with the additional wireless communicator of the additional electrical device using the wireless communicator.

In accordance with a seventh aspect of the present invention, the electrical device according to any one of the first to sixth aspects further comprises an electronic controller at least partially provided in the internal space. The electronic controller is electrically connected to the force sensor.

With the electrical device according to the seventh aspect, it is possible to utilize the force measured by the force sensor in the electronic controller.

In accordance with an eighth aspect of the present invention, the electrical device according to the seventh aspect further comprises a flexible printed circuit electrically connecting the force sensor and the electronic controller.

With the electrical device according to the eighth aspect, it is possible to improve flexibility of arrangement of the force sensor and the electronic controller using the flexible printed circuit.

In accordance with a ninth aspect of the present invention, the electrical device according to any one of the first to eighth aspects is configured so that the force sensor includes a strain gauge attached to the attachment surface.

With the electrical device according to the ninth aspect, it is possible to measure the force with a comparatively simple structure.

In accordance with a tenth aspect of the present invention, the electrical device according to any one of the first to ninth aspects is configured so that the housing includes a cover. The base plate and the cover at least partially define the internal space.

With the electrical device according to the tenth aspect, it is possible to protect an electric part of the electrical device using the cover.

In accordance with an eleventh aspect of the present invention, the electrical device according to any one of the first to tenth aspects is configured so that the force sensor is configured to be at least partially provided in the adhesive agent.

With the electrical device according to the eleventh aspect, it is possible to improve adhesive strength between the force sensor and the additional attachment surface of the rotational device.

In accordance with a twelfth aspect of the present invention, a rotational device for a human-powered vehicle comprises a crank arm and the electrical device according to any one of the first to eleventh aspects. The force sensor and the attachment surface are attached to the crank arm with the adhesive agent.

With the electrical device according to the twelfth aspect, it is possible to apply the electrical device to the crank arm.

In accordance with a thirteenth aspect of the present invention, the electrical device according to the twelfth aspect is configured so that the force sensor is at least partially provided in the adhesive agent.

With the electrical device according to the thirteenth aspect, it is possible to improve adhesive strength between the force sensor and the crank arm.

In accordance with a fourteenth aspect of the present invention, the electrical device according to the twelfth or thirteenth aspect further comprises a crank axle and a sprocket. The crank arm is secured to the crank axle.

With the electrical device according to the fourteenth aspect, it is possible to apply the electrical device to a crank assembly.

In accordance with a fifteenth aspect of the present invention, the electrical device according to the fourteenth aspect is configured so that the electrical device is at least partially provided to at least one of the crank axle, the crank arm, and the sprocket.

With the electrical device according to the fifteenth aspect, it is possible to utilize at least one of the crank axle, the crank arm, and the sprocket as a place where the electrical device is provided.

In accordance with a sixteenth aspect of the present invention, a rotational device for a human-powered vehicle comprises a pedal axle, a pedal body rotatably coupled to the pedal axle, and the electrical device according to any one of the first to eleventh aspects. The force sensor and the attachment surface are attached to at least one of the pedal axle and the pedal body with the adhesive agent.

With the electrical device according to the sixteenth aspect, it is possible to apply the electrical device to a pedal.

In accordance with a seventeenth aspect of the present invention, the electrical device according to the sixteenth aspect is configured so that the force sensor is at least partially provided in the adhesive agent.

With the electrical device according to the seventeenth aspect, it is possible to improve adhesive strength between the force sensor and the at least one of the pedal axle and the pedal body.

In accordance with an eighteenth aspect of the present invention, the electrical device according to the sixteenth or seventeenth aspect is configured so that the electrical device is at least partially provided to at least one of the pedal axle and the pedal body.

With the electrical device according to the eighteenth aspect, it is possible to utilize at least one of the pedal axle and the pedal body as a place where the electrical device is provided.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is a schematic block diagram of the rotational device illustrated in FIG. 1.

FIG. 8 is a schematic block diagram of the rotational device illustrated in FIG. 7.

FIG. 12 is a schematic block diagram of the rotational device illustrated in FIG. 11.

FIG. 18 is a schematic block diagram of the rotational device illustrated in FIG. 16.

DESCRIPTION OF THE EMBODIMENTS

Figure 1:
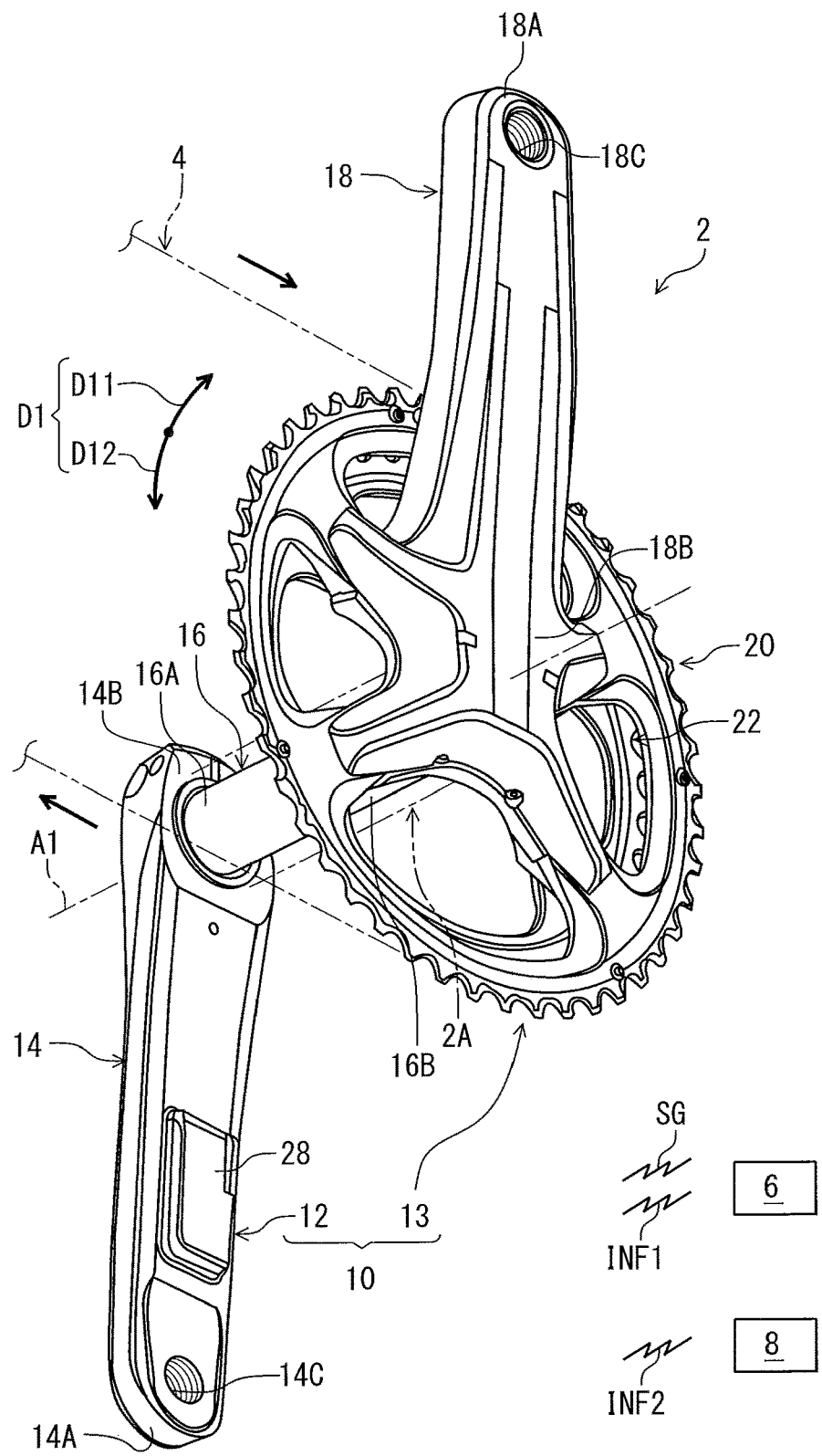
FIG. 1 is a perspective view of a rotational device of a human-powered vehicle in accordance with a first embodiment.

The embodiments will now be described with reference to the accompanying drawings, wherein like reference numerals designate corresponding or identical elements throughout the various drawings.

First Embodiment

As seen in FIG. 1, a human-powered vehicle 2 includes a rotational device 10 in accordance with one of embodiments. The rotational device 10 for the human-powered vehicle 2 comprises an electrical device 12. Examples of the rotational device 10 include a crank assembly, a pedal, and a combination thereof. Examples of the electrical device 12 include a crank power meter and a pedal power meter. In the present embodiment, the rotational device 10 includes a crank assembly 13. The electrical device 12 includes a crank power meter. However, the rotational device 10 can include other devices such as a pedal if needed and/or desired. The electrical device 12 can include other devices such as a pedal power meter if needed and/or desired.

In the present application, the term "human-powered vehicle" includes a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

As seen in FIG. 1, the rotational device 10 is rotatable relative to a vehicle body 2A of the human-powered vehicle 2 about a rotational axis A1. The rotational device 10 is rotatable relative to the vehicle body 2A of the human-powered vehicle 2 about the rotational axis A1 in a rotational direction D1. The rotational device 10 is rotatable relative to the vehicle body 2A of the human-powered vehicle 2 about the rotational axis A1 in a driving rotational direction D11 during pedaling. The rotational direction D1 includes the driving rotational direction D11 and a reverse rotational direction D12. The reverse rotational direction D12 is an opposite direction of the driving rotational direction D11.

The rotational device 10 for the human-powered vehicle 2 comprises a crank arm 14. The rotational device 10 further comprises a crank axle 16. The rotational device 10 further comprises a crank arm 18. The crank assembly 13 includes the crank arm 14, the crank axle 16, and the crank arm 18. The crank arm 14 is secured to the crank axle 16. The crank arm 18 is secured to the crank axle 16. The crank arm 14, the crank axle 16, and the crank arm 18 are rotatable relative to the vehicle body 2A of the human-powered vehicle 2 in the driving rotational direction D11.

The rotational device 10 further comprises a sprocket 20. The rotational device 10 further comprises a sprocket 22. The sprocket 20 is configured to engage with a chain 4. The sprocket 22 is configured to engage with the chain 4. The sprocket 20 or 22 is configured to transmit a driving force to another sprocket such as a rear sprocket via the chain 4. The sprocket 20 is secured to at least one of the crank axle 16 and the crank arm 18. The sprocket 22 is secured to at least one of the crank axle 16, the crank arm 18, and the sprocket 20. The sprocket 22 can be omitted from the rotational device 10 if needed and/or desired.

The crank axle 16 includes a first axle end 16A and a second axle end 16B. The crank axle 16 extends between the first axle end 16A and the second axle end 16B along the rotational axis A1. The crank arm 14 is secured to the first axle end 16A. The crank arm 18 is secured to the second axle end 16B.

The crank arm 14 includes has a first end 14A and a second end 14B. The crank arm 14 extends between the first end 14A and the second end 14B. The first end 14A includes a pedal securing hole 14C to which a pedal is attachable. The second end 14B is secured to the first axle end 16A of the crank axle 16.

The crank arm 18 includes has a first end 18A and a second end 18B. The crank arm 18 extends between the first end 18A and the second end 18B. The first end 18A includes a pedal securing hole 18C to which a pedal is attachable. The second end 18B is secured to the first axle end 16B of the crank axle 16.

In the present embodiment, the crank arm 14 is a left crank arm while the crank arm 18 is a right crank arm. However, the crank arm 14 can be a right crank arm if needed and/or desired. The crank arm 18 can be a left crank arm if needed and/or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or a steering. Accordingly, these terms, as utilized to describe the rotational device 10, the electrical device 12, or other components, should be interpreted relative to the human-powered vehicle 2 equipped with the rotational device 10, the electrical device 12, or other components as used in an upright riding position on a horizontal surface.

Figure 2:
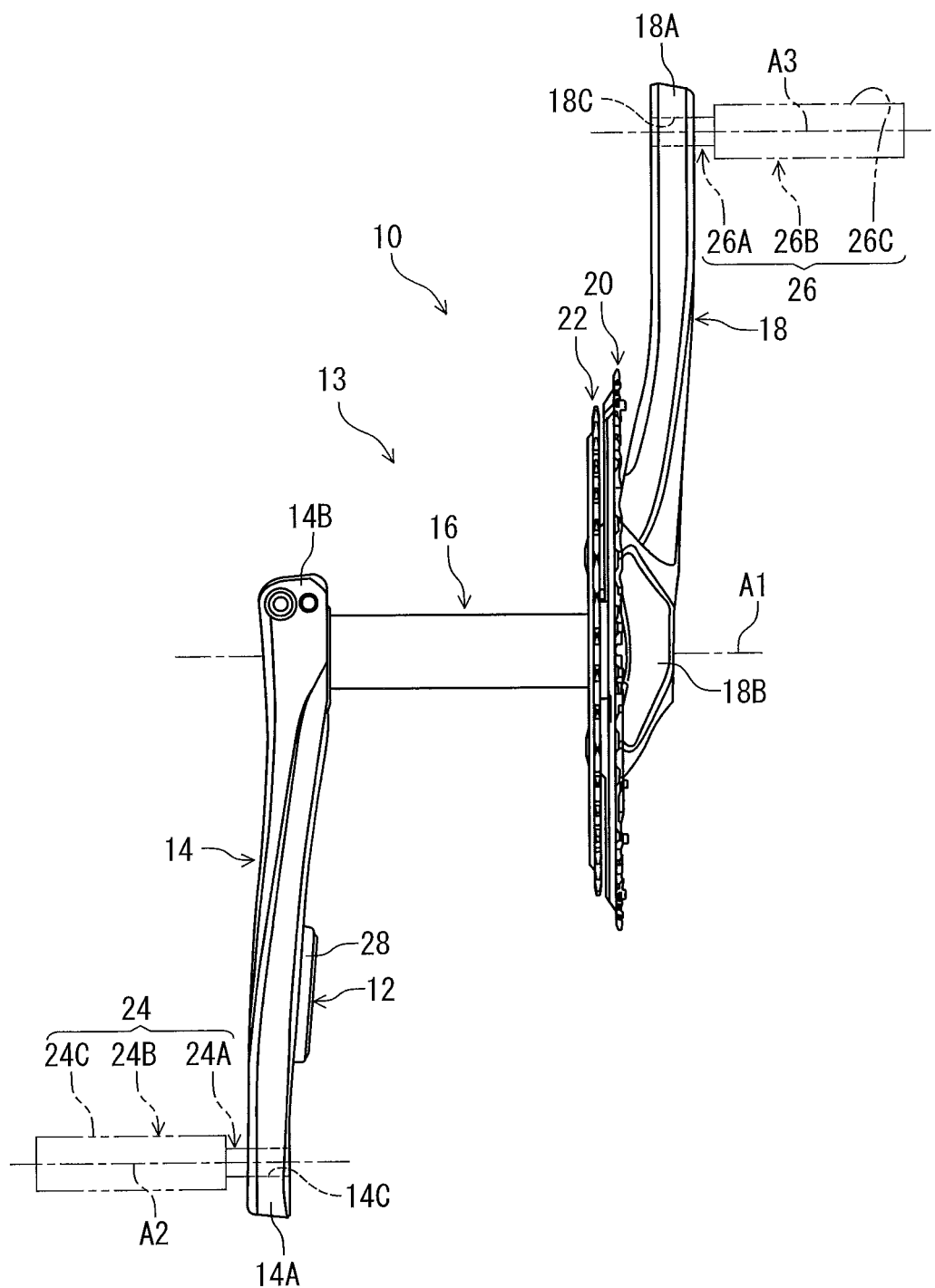
FIG. 2 is a side-elevational view of the rotational device illustrated in FIG. 1.

As seen in FIG. 2, the rotational device 10 for the human-powered vehicle 2 comprises a pedal 24. The pedal 24 includes a pedal axle 24A and a pedal body 24B. Namely, the rotational device 10 for the human-powered vehicle 2 comprises the pedal axle 24A and the pedal body 24B. The pedal body 24B is rotatably coupled to the pedal axle 24A. The pedal axle 24A is configured to be secured to the crank arm 14 of the rotational device 10. The pedal axle 24A is threadedly engaged with the pedal securing hole 14C of the crank arm 14.

The pedal body 24B is rotatably coupled to the pedal axle 24A about a rotational axis A2. The pedal axle 24A extends along the rotational axis A2. The pedal body 24B includes a tread surface 24C on which a shoe of the user is to be put. The pedal body 24B can include a binding structure to which a cleat of the shoe is to be fixedly coupled.

The rotational device 10 for the human-powered vehicle comprises a pedal 26.

The pedal 26 includes a pedal axle 26A and a pedal body 26B. Namely, the rotational device 10 for the human-powered vehicle 2 comprises the pedal axle 26A and the pedal body 26B. The pedal body 26B is rotatably coupled to the pedal axle 26A. The pedal axle 26A is configured to be secured to the crank arm 18 of the rotational device 10. The pedal axle 26A is threadedly engaged with the pedal securing hole 18C of the crank arm 18.

The pedal body 26B is rotatably coupled to the pedal axle 26A about a rotational axis A3. The pedal axle 26A extends along the rotational axis A3. The pedal body 26B includes a tread surface 26C on which a shoe of the user is to be put. The pedal body 26B can include a binding structure to which a cleat of the shoe is to be fixedly coupled.

The electrical device 12 is at least partially provided to at least one of the crank axle 16, the crank arm 14, and the sprocket 20 and/or 22. The electrical device 12 is at least partially provided to the crank arm 14. In the present embodiment, the electrical device 12 is entirely provided to the crank arm 14. The electrical device 12 is provided between the first end 14A and the second end 14B. The electrical device 12 is attached to an outer surface of the crank arm 14. However, the electrical device 12 can be at least partially provided inside the crank arm 14 if needed and/or desired. The electrical device 12 can be at least partially provided to at least one of the crank axle 16, the crank arm 18, and the sprocket 20 and/or 22 if needed and/or desired.

As seen in FIG. 3, the electrical device 12 further comprises an electronic controller EC1. The electrical device 12 further comprises a wireless communicator WC1. The wireless communicator WC1 is configured to wirelessly communicate with an additional wireless communicator WC2 of an additional electric device 6. The wireless communicator WC1 is configured to wirelessly transmit force relating to the rotational device 10. The electronic controller EC1 is electrically connected to the wireless communicator WC1. The electrical device 12 for the rotational device 10 of the human-powered vehicle 2 comprises a housing 28. The wireless communicator WC1 and the electronic controller EC1 are provided in the housing 28. As seen in FIG. 1, the housing 28 is attached to the crank assembly 13. The housing 28 is attached to the crank arm 14.

The electronic controller EC1 includes a processor 30P, a memory 30M, a circuit board 30C, and a bus 30D. The processor 30P is coupled to the memory 30M. The memory 30M is coupled to the processor 30P. The processor 30P and the memory 30M are electrically mounted on the circuit board 30C. The processor 30P is electrically connected to the memory 30M via the circuit board 30C and the bus 30D. The memory 30M is electrically connected to the processor 30P via the circuit board 30C and the bus 30D. The bus 30D is provided on the circuit board 30C. The electronic controller EC1 includes a semiconductor.

For example, the processor 30P includes at least one of a central processing unit (CPU), a micro processing unit (MPU), and a memory controller. The memory 30M is electrically connected to the processor 30P. For example, the memory 30M includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a hard disc drive (HDD). The memory 30M includes storage areas each having an address. The processor 30P is configured to control the memory 30M to store data in the storage areas of the memory 30M and reads data from the storage areas of the memory 30M. The processor 30P can also be referred to as a hardware processor 30P. The memory 30M can also be referred to as a hardware memory 30M. The memory 30M can also be referred to as a computer-readable storage medium 30M.

The electronic controller EC1 is programed to execute at least one control algorithm of the electrical device 12. The memory 30M (e.g., the ROM) stores at least one program including at least one program instruction. The at least one program is read into the processor 30P, and thereby the at least one control algorithm of the electrical device 12 is executed based on the at least one program. The electronic controller EC1 can also be referred to as an electronic controller circuit or circuitry EC1. The electronic controller EC1 can also be referred to as a hardware electronic controller EC1.

The structure of the electronic controller EC1 is not limited to the above structure. The structure of the electronic controller EC1 is not limited to the processor 30P, the memory 30M, and the bus 30D. The electronic controller EC1 can be realized by hardware alone or a combination of hardware and software. The processor 30P and the memory 30M can be integrated as a one chip such as an application specific integrated circuit (ASIC) or a field programmable gate array (FPGA).

As seen in FIG. 3, the wireless communicator WC1 is electrically connected to the processor 30P and the memory 30M with the circuit board 30C and the bus 30D. The wireless communicator WC1 is electrically mounted on the circuit board 30C. The wireless communicator WC1 includes a signal transmitting circuit or circuitry, a signal receiving circuit or circuitry, and an antenna. Thus, the wireless communicator WC1 can also be referred to as a wireless communicator circuit or circuitry WC1.

The wireless communicator WC1 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the wireless communicator WC1 is configured to encrypt signals using a cryptographic key to generate encrypted wireless signals. The wireless communicator WC1 is configured to transmit wireless signals via the antenna. The wireless communicator WC1 can be a one-way wireless communication device such as a receiver, or a two-way wireless communication device such as a transceiver.

The wireless communicator WC1 is configured to receive wireless signals via the antenna. In the present embodiment, the wireless communicator WC1 is configured to decode the wireless signals to recognize signals transmitted from other wireless communicators. The wireless communicator WC1 is configured to decrypt the wireless signals using the cryptographic key.

As seen in FIG. 3, the electrical device 12 for the rotational device 10 of the human-powered vehicle 2 comprises a force sensor 32. The force sensor 32 is configured to obtain rotational information INF1. The rotational information INF1 includes a force applied to the rotational device 10 in the rotational direction D1 (see e.g., FIG. 1). Thus, the force sensor 32 is configured to measure the force applied to the rotational device 10. The force sensor 32 is configured to output a measurement value indicating the force applied to the rotational device 10 in the rotational direction D1. In the present embodiment, the force sensor 32 is configured to measure the force applied to the crank assembly 13. The force sensor 32 is configured to measure the force applied to the crank arm 14. However, the force sensor 32 can be configured to measure the force applied to another part of the rotational device 10 if needed and/or desired. The force sensor 32 can be configured to measure the force applied to another part (e.g., the crank axle 16, the crank arm 18) of the crank assembly 13 if needed and/or desired.

The electronic controller EC1 is configured to receive the rotational information INF1 obtained by the force sensor 32. The electronic controller EC1 is electrically connected to the force sensor 32. The electronic controller EC1 is electrically connected to the force sensor 32 to receive the rotational information INF1 obtained by the force sensor 32. The electronic controller EC1 is configured to receive the force measured by the force sensor 32. The electronic controller EC1 is electrically connected to the force sensor 32 to receive the force measured by the force sensor 32.

For example, the force sensor 32 includes a strain gauge 34 and a measurement circuit 36. The strain gauge 34 is attached to the crank assembly 13. The strain gauge 34 is attached to the crank arm 14. The strain gauge 34 is configured to output a change in electrical resistance depending on the deformation amount of the rotational device 10. The strain gauge 34 is configured to output the change in the electrical resistance depending on the deformation amount of the crank arm 14. The measurement circuit 36 is electrically connected to the strain gauge 34 to convert the output of the strain gauge 34 to a voltage indicating the deformation amount of the rotational device 10 (e.g., the crank arm 14). For example, the measurement circuit 36 constitutes a bridge circuit with the strain gauge 34. The strain gauge 34 includes at least one strain gauge element. For example, the strain gauge 34 can include four strain gauge elements. The strain gauge elements are arranged to detect extension and compression in directions parallel to the longitudinal direction of the crank arm 14.

The measurement circuit 36 is electrically connected to the electronic controller EC1. The measurement circuit 36 is electrically mounted on the circuit board 30C of the electronic controller EC1. For example, the measurement circuit 36 is electrically connected to the strain gauge 34 via the circuit board 30C and an additional circuit board such as a flexible printed circuit. The electronic controller EC1 is electrically connected to the measurement circuit 36 to receive the rotational information INF1. The electronic controller EC1 is electrically connected to the measurement circuit 36 to receive the deformation amount of the rotational device 10 (e.g., the crank arm 14).

As seen in FIG. 3, the electrical device 12 further comprises a position detector 38. The position detector 38 is configured to obtain the rotational information INF1. The rotational information INF1 includes a rotational position of the rotational device 10. Thus, the position detector 38 is configured to detect the rotational position of the rotational device 10.

The electronic controller EC1 is configured to receive the rotational information INF1 obtained by the position detector 38. The electronic controller EC1 is electrically connected to the position detector 38 to receive the rotational information INF1 obtained by the position detector 38. The electronic controller EC1 is configured to receive the rotational position detected by the position detector 38. The electronic controller EC1 is electrically connected to the position detector 38 to receive the rotational position detected by the position detector 38.

In the present embodiment, the position detector 38 includes an acceleration sensor. The acceleration sensor is configured to detect an inclination angle of the crank arm 14 about the rotational axis A1 as the rotational position of the rotational device 10. The inclination angle of the crank arm 14 indicates the rotational position of the rotational device 10. Examples of the acceleration sensor include a dual-axis acceleration sensor.

The electronic controller EC1 is electrically connected to the acceleration sensor to receive the inclination angle detected by the acceleration sensor of the position detector 38. The electronic controller EC1 is configured to calculate the rotational position of the rotational device 10 based on the inclination angle detected by the acceleration sensor of the position detector 38. The position detector 38 can include other sensors such as a gyro meter or a magnetic sensor (e.g., a magnetic body and a hall sensor) instead of or in addition to the acceleration sensor if needed and/or desired.

The electronic controller EC1 is configured to count the number of revolutions of the rotational device 10 per unit time based on the rotational position detected by the position detector 38. Namely, the electronic controller EC1 is configured to obtain a rotational speed (e.g., a cadence) of the rotational device 10 based on the rotational position detected by the position detector 38. However, the electrical device 12 can include a cadence sensor which is a separate sensor from the position detector 38 if needed and/or desired. In such embodiments, the cadence sensor includes a detection object and a detector. The detection object is provided to one of the vehicle body 2A (see e.g., FIG. 1) and the rotational device 10. The detector is provided to the other of the vehicle body 2A and the rotational device 10. The detector is configured to detect the detection object.

As seen in FIG. 3, the electrical device 12 includes an electric power source 42 and a power-source holder 44. The electric power source 42 is electrically connected to the wireless communicator WC1, the electronic controller EC1, the force sensor 32, and the position detector 38 to supply electricity to the wireless communicator WC1, the electronic controller EC1, the force sensor 32, and the position detector 38. The power-source holder 44 is electrically connected to the wireless communicator WC1, the electronic controller EC1, the force sensor 32, and the position detector 38 to supply electricity from the electric power source 42 to the wireless communicator WC1, the electronic controller EC1, the force sensor 32, and the position detector 38. The power-source holder 44 is configured to detachably hold the electric power source 42. Examples of the electric power source 42 include a battery (e.g., a primary battery, a secondary battery).

The electronic controller EC1 is configured to calculate the force based on the deformation amount of the rotational device 10 (e.g., the crank arm 14) obtained by the force sensor 32. The electronic controller EC1 is configured to calculate the force (e.g., torque) applied to the rotational device 10 based on the deformation amount of the rotational device 10 (e.g., the crank arm 14) obtained by the force sensor 32. The rotational information INF1 includes power INF11 applied to the rotational device 10 and a rotational speed INF12 of the rotational device 10. For example, the electronic controller EC1 is configured to calculate the power INF11 applied to the rotational device 10 based on the torque applied to the rotational device 10 (e.g., the crank arm 14) and the rotational speed INF12 of the rotational device 10. However, the electronic controller EC1 can be configured to calculate the power INF11 applied to the rotational device 10 based on other data if needed and/or desired. For example, the electronic controller EC1 can be configured to calculate an average of the power INF11 during one revolution of the crank arm 14. For example, the electronic controller EC1 can be configured to calculate total power during one revolution of the crank assembly 13 by doubling the power INF11 on the only one crank arm.

The electronic controller EC1 is configured to control the wireless communicator WC1 to wirelessly transmit the rotational information INF1. The electronic controller EC1 is configured to control the wireless communicator WC1 to wirelessly transmit the power INF11 calculated by the electronic controller EC1 based on the force detected by the force sensor 32. The electronic controller EC1 is configured to control the wireless communicator WC1 to wirelessly transmit the rotational speed INF12 calculated by the electronic controller EC1.

The electrical device 12 includes an electric connector port 45 to which a cable connector of an electric cable is detachably connectable. The electric connector port 45 is electrically connected to the electronic controller EC1. In a case where the electric power source 42 includes a secondary battery, the electric power source 42 can be charged via the electric connector port 45. In such embodiments, the electrical device 12 includes a voltage controller configured to control electricity supplied from an electric power supply via the electric connector port 45. The electronic controller EC1 can be configured to communicate with another electrical device 12 via the electric connector port 45 and an electric cable for maintenance such as updating software if needed and/or desired.

The electrical device 12 is configured to communicate with the additional electrical device 6. The additional electrical device 6 is configured to wirelessly receive the rotational information INF1 (e.g., the power INF11, the rotational speed INF12) from the electrical device 12. The additional electrical device 6 is configured to wirelessly transmit a signal SG to the electrical device 12 at predetermined intervals. The electrical device 12 is configured to recognize that the wireless communication is normal between the electrical device 12 and the additional electrical device 6 based on the signal SG. Examples of the additional electrical device 6 include a cyclocomputer, a smartphone, and a tablet computer.

The additional electrical device 6 includes the additional wireless communicator WC2, an additional electronic controller EC2, a display 46, and a user interface 48. The additional electronic controller EC2 is electrically connected to the additional wireless communicator WC2, the display 46, and the user interface 48 to control the additional wireless communicator WC2, the display 46, and the user interface 48.

The additional wireless communicator WC2 is configured to wirelessly receive the rotational information INF1 from the wireless communicator WC1. The additional electronic controller EC2 is electrically connected to the additional wireless communicator WC2 to receive the rotational information INF1 (e.g., the power INF11, the rotational speed INF12) wirelessly received by the additional wireless communicator WC2.

As seen in FIG. 3, the additional electronic controller EC2 includes a processor 50P, a memory 50M, a circuit board 50C, and a bus 50D. The processor 50P is coupled to the memory 50M. The memory 50M is coupled to the processor 50P. The processor 50P and the memory 50M are electrically mounted on the circuit board 50C. The processor 50P is electrically connected to the memory 50M via the circuit board 50C and the bus 50D. The memory 50M is electrically connected to the processor 50P via the circuit board 50C and the bus 50D. The bus 50D is provided on the circuit board 50C. The additional electronic controller EC2 includes a semiconductor.

For example, the processor 50P includes at least one of a CPU, a MPU, and a memory controller. The memory 50M is electrically connected to the processor 50P. For example, the memory 50M includes at least one of a volatile memory and a non-volatile memory. Examples of the volatile memory include a RAM and a DRAM. Examples of the non-volatile memory include a ROM, an EEPROM, and an HDD. The memory 50M includes storage areas each having an address. The processor 50P is configured to control the memory 50M to store data in the storage areas of the memory 50M and reads data from the storage areas of the memory 50M. The processor 50P can also be referred to as a hardware processor 50P. The memory 50M can also be referred to as a hardware memory 50M. The memory 50M can also be referred to as a computer-readable storage medium 50M.

The additional electronic controller EC2 is programed to execute at least one control algorithm of the additional electrical device 6. The memory 50M (e.g., the ROM) stores at least one program including at least one program instruction. The at least one program is read into the processor 50P, and thereby the at least one control algorithm of the additional electrical device 6 is executed based on the at least one program. The additional electronic controller EC2 can also be referred to as an electronic controller circuit or circuitry EC2. The additional electronic controller EC2 can also be referred to as a hardware additional electronic controller EC2.

The structure of the additional electronic controller EC2 is not limited to the above structure. The structure of the additional electronic controller EC2 is not limited to the processor 50P, the memory 50M, and the bus 50D. The additional electronic controller EC2 can be realized by hardware alone or a combination of hardware and software. The processor 50P and the memory 50M can be integrated as a one chip such as an ASIC or a FPGA.

As seen in FIG. 3, the additional wireless communicator WC2 is electrically connected to the processor 50P and the memory 50M with the circuit board 50C and the bus 50D. The additional wireless communicator WC2 is electrically mounted on the circuit board 50C. The additional wireless communicator WC2 includes a signal transmitting circuit or circuitry, a signal receiving circuit or circuitry, and an antenna. Thus, the additional wireless communicator WC2 can also be referred to as an additional wireless communicator circuit or circuitry WC2.

The additional wireless communicator WC2 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the additional wireless communicator WC2 is configured to encrypt signals using a cryptographic key to generate encrypted wireless signals. The additional wireless communicator WC2 is configured to transmit wireless signals via the antenna. The additional wireless communicator WC2 can be a one-way wireless communication device such as a receiver, or a two-way wireless communication device such as a transceiver.

The additional wireless communicator WC2 is configured to receive wireless signals via the antenna. In the present embodiment, the additional wireless communicator WC2 is configured to decode the wireless signals to recognize signals transmitted from other additional wireless communicators. The additional wireless communicator WC2 is configured to decrypt the wireless signals using the cryptographic key.

The display 46 is configured to display the rotational information INF1 (e.g., the power INF11, the rotational speed INF12) wirelessly transmitted from the wireless communicator WC1 of the electrical device 12. The additional electronic controller EC2 is configured to control the display 46 to display the rotational information INF1 (e.g., the power INF11, the rotational speed INF12).

The user interface 48 is configured to receive a user input. Examples of the user interface 48 include a mouse, a keyboard, and a touch panel. The additional electronic controller EC2 is configured to receive the user input via the user interface 48.

The additional electrical device 6 includes an electric power source 52 and a power-source holder 54. The electric power source 52 is electrically connected to the additional wireless communicator WC2, the additional electronic controller EC2, the display 46, and the user interface 48 to supply electricity to the additional wireless communicator WC2, the additional electronic controller EC2, the display 46, and the user interface 48. The power-source holder 54 is electrically connected to the additional wireless communicator WC2, the additional electronic controller EC2, the display 46, and the user interface 48 to supply electricity from the electric power source 52 to the additional wireless communicator WC2, the additional electronic controller EC2, the display 46, and the user interface 48. The power-source holder 54 is configured to detachably hold the electric power source 52. Examples of the electric power source 52 include a battery (e.g., a primary battery, a secondary battery).

As seen in FIG. 3, the electrical device 12 is configured to communicate with an external electrical device 8. The external electrical device 8 is configured to receive a user input INF2 from the user. The external electrical device 8 is configured transmit the user input INF2 to the electrical device 12. The electronic controller EC1 is configured to receive the user input INF2 from the external electrical device 8. Examples of the external electrical device 8 include a cyclocomputer, a smartphone, a tablet computer, and a personal computer.

The external electrical device 8 includes an external wireless communicator WC3, an external electronic controller EC3, a display 56, and a user interface 58. The external electronic controller EC3 is electrically connected to the external wireless communicator WC3, the display 56, and the user interface 58 to control the external wireless communicator WC3, the display 56, and the user interface 58.

As seen in FIG. 3, the external electronic controller EC3 includes a processor 60P, a memory 60M, a circuit board 60C, and a bus 60D. The processor 60P is coupled to the memory 60M. The memory 60M is coupled to the processor 60P. The processor 60P and the memory 60M are electrically mounted on the circuit board 60C. The processor 60P is electrically connected to the memory 60M via the circuit board 60C and the bus 60D. The memory 60M is electrically connected to the processor 60P via the circuit board 60C and the bus 60D. The bus 60D is provided on the circuit board 60C. The external electronic controller EC3 includes a semiconductor.

For example, the processor 60P includes at least one of a CPU, a MPU, and a memory controller. The memory 60M is electrically connected to the processor 60P. For example, the memory 60M includes at least one of a volatile memory and a non-volatile memory. Examples of the volatile memory include a RAM and a DRAM. Examples of the non-volatile memory include a ROM, an EEPROM, and an HDD. The memory 60M includes storage areas each having an address. The processor 60P is configured to control the memory 60M to store data in the storage areas of the memory 60M and reads data from the storage areas of the memory 60M. The processor 60P can also be referred to as a hardware processor 60P. The memory 60M can also be referred to as a hardware memory 60M. The memory 60M can also be referred to as a computer-readable storage medium 60M.

The external electronic controller EC3 is programed to execute at least one control algorithm of the additional electrical device 6. The memory 60M (e.g., the ROM) stores at least one program including at least one program instruction. The at least one program is read into the processor 60P, and thereby the at least one control algorithm of the additional electrical device 6 is executed based on the at least one program. The external electronic controller EC3 can also be referred to as an electronic controller circuit or circuitry EC3. The external electronic controller EC3 can also be referred to as a hardware external electronic controller EC3.

The structure of the external electronic controller EC3 is not limited to the above structure. The structure of the external electronic controller EC3 is not limited to the processor 60P, the memory 60M, and the bus 60D. The external electronic controller EC3 can be realized by hardware alone or a combination of hardware and software. The processor 60P and the memory 60M can be integrated as a one chip such as an ASIC or a FPGA.

The external wireless communicator WC3 is configured to wirelessly communicate with another wireless communicator such as the wireless communicator WC1 and the additional wireless communicator WC2. However, the external electrical device 8 can include an external wired communicator if needed and/or desired. The external wired communicator is configured to communicate with the electrical device 12 via an electric cable using power line communication (PLC) technology.

As seen in FIG. 3, the external wireless communicator WC3 is electrically connected to the processor 60P and the memory 60M with the circuit board 60C and the bus 60D. The external wireless communicator WC3 is electrically mounted on the circuit board 60C. The external wireless communicator WC3 includes a signal transmitting circuit or circuitry, a signal receiving circuit or circuitry, and an antenna. Thus, the external wireless communicator WC3 can also be referred to as an external wireless communicator circuit or circuitry WC3.

The external wireless communicator WC3 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the external wireless communicator WC3 is configured to encrypt signals using a cryptographic key to generate encrypted wireless signals. The external wireless communicator WC3 is configured to transmit wireless signals via the antenna. The external wireless communicator WC3 can be a one-way wireless communication device such as a receiver, or a two-way wireless communication device such as a transceiver.

The external wireless communicator WC3 is configured to receive wireless signals via the antenna. In the present embodiment, the external wireless communicator WC3 is configured to decode the wireless signals to recognize signals transmitted from other external wireless communicators. The external wireless communicator WC3 is configured to decrypt the wireless signals using the cryptographic key.

The display 56 is configured to display information relating to the human-powered vehicle 2. The external electronic controller EC3 is configured to control the display 56 to display the information relating to the human-powered vehicle 2. For example, the information relating to the human-powered vehicle 2 includes the rotational information INF1 and the settings of the rotational device 10.

The user interface 58 is configured to receive the user input INF2. Examples of the user interface 58 include a mouse, a keyboard, and a touch panel. The external electronic controller EC3 is configured to receive the user input via the user interface 58. The external electronic controller EC3 is configured to receive the user input INF2 via the user interface 58.

The electronic controller EC1 is configured to receive the user input INF2 from the external electrical device 8. The electronic controller EC1 is configured to receive the user input INF2 via the wireless communicator WC1 and the external wireless communicator WC3. For example, the electronic controller EC1 is configured to change settings based on the user input INF2.

The external electrical device 8 includes an electric power source 62 and a power-source holder 64. The electric power source 62 is electrically connected to the external wireless communicator WC3, the external electronic controller EC3, the display 56, and the user interface 58 to supply electricity to the external wireless communicator WC3, the external electronic controller EC3, the display 56, and the user interface 58. The power-source holder 64 is electrically connected to the external wireless communicator WC3, the external electronic controller EC3, the display 56, and the user interface 58 to supply electricity from the electric power source 62 to the external wireless communicator WC3, the external electronic controller EC3, the display 56, and the user interface 58. The power-source holder 64 is configured to detachably hold the electric power source 62. Examples of the electric power source 62 include a battery (e.g., a primary battery, a secondary battery).

As seen in FIG. 3, the electronic controller EC1 is configured to control the wireless communicator WC1 to wirelessly transmit the rotational information INF1 at predetermined intervals. The electronic controller EC1 is configured to control the wireless communicator WC1 to wirelessly transmit the rotational information INF1 using wireless signals at the predetermined intervals. The electronic controller EC1 is configured to control the wireless communicator WC1 to wirelessly transmit the power INF11 and the rotational speed INF12 using the wireless signals at the predetermined intervals.

The additional wireless communicator WC2 of the additional electrical device 6 is configured to wirelessly receive the rotational information INF1 transmitted from the wireless communicator WC1 of the electrical device 12 at the predetermined intervals. The additional wireless communicator WC2 of the additional electrical device 6 is configured to wirelessly receive the power INF11 and the rotational speed INF12 transmitted from the wireless communicator WC1 of the electrical device 12 at the predetermined intervals.

The additional electronic controller EC2 of the additional electrical device 6 is configured to control the display 46 to display the rotational information INF1 wirelessly received by the additional wireless communicator WC2 at the predetermined intervals. The additional electronic controller EC2 is configured to control the display 46 to display the power INF11 and the rotational speed INF12 wirelessly received by the additional wireless communicator WC2 at the predetermined intervals. The additional electronic controller EC2 is configured to control the display 46 to display the latest values of the power INF11 and the rotational speed INF12. Thus, the user can recognize the power INF11 and the rotational speed INF12 of the rotational device 10 via the display 46 of the additional electrical device 6 during pedaling.

Figure 4:
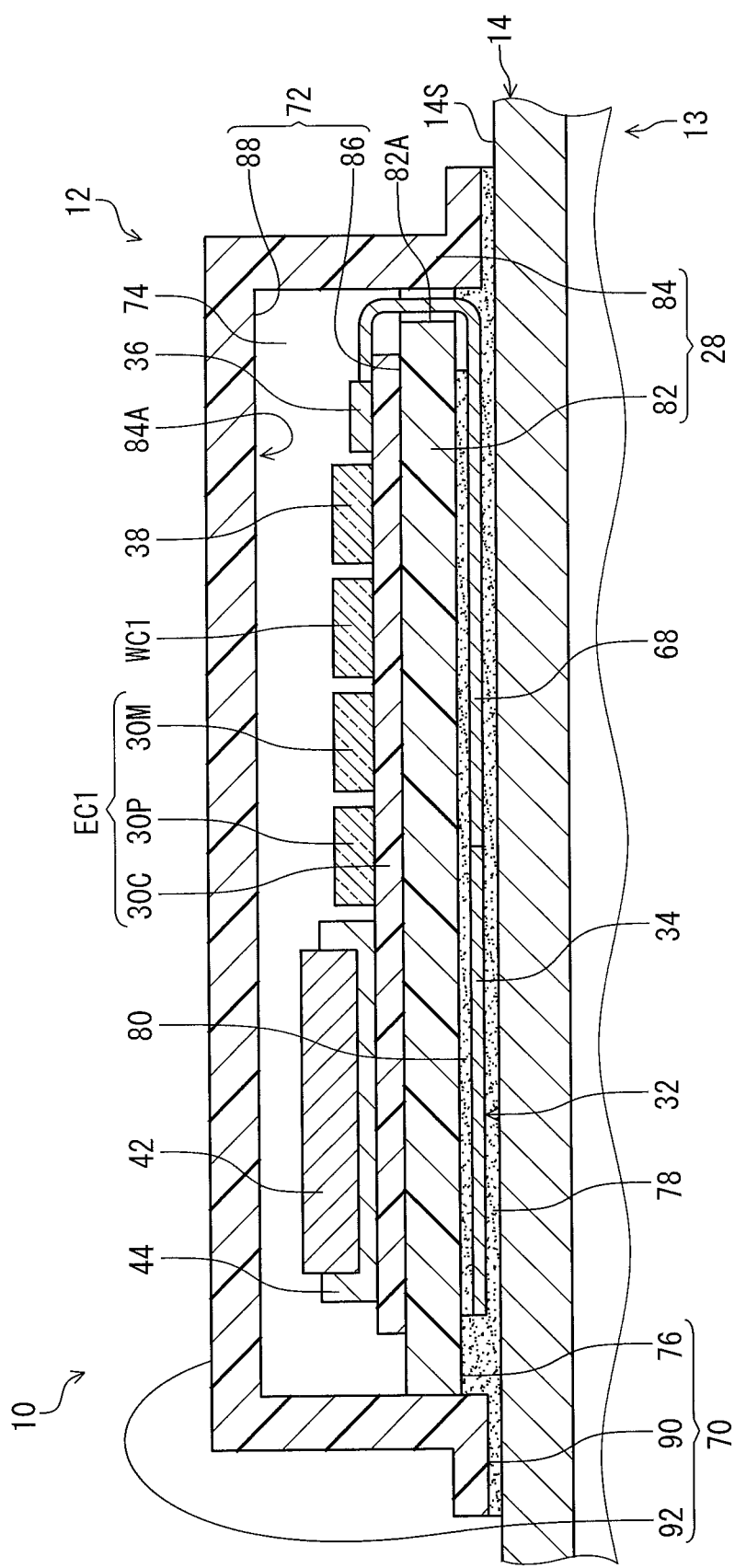
FIG. 4 is a schematic cross-sectional view of the rotational device illustrated in FIG. 1.

As seen in FIG. 4, the electrical device 12 further comprises a flexible printed circuit 68. The flexible printed circuit 68 electrically connects the force sensor 32 and the electronic controller EC1. The flexible printed circuit 68 electrically connects the strain gauge 34 and the measurement circuit 36. The measurement circuit 36 is electrically mounted on the circuit board 30C of the electronic controller EC1. Thus, the flexible printed circuit 68 electrically connects the force sensor 32 and the circuit board 30C of the electronic controller EC1. For example, the measurement circuit 36 constitutes a bridge circuit with the strain gauge 34 and the flexible printed circuit 68.

The housing 28 includes an outer surface 70 and an inner surface 72. The inner surface 72 defines an internal space 74. The housing 28 is configured to be attached to an additional attachment surface 14S of the rotational device 10 with an adhesive agent 78. The outer surface 70 is configured to be attached to the additional attachment surface 14S of the rotational device 10 with the adhesive agent 78. The outer surface 70 includes an attachment surface 76. The attachment surface 76 is configured to be attached to the additional attachment surface 14S of the rotational device 10 with the adhesive agent 78.

In the present embodiment, the crank arm 14 includes the additional attachment surface 14S. The attachment surface 76 is configured to be attached to the additional attachment surface 14S of the crank arm 14 with the adhesive agent 78. However, the attachment surface 76 can be configured to be attached to an additional attachment surface of another part of the rotational device 10 with an adhesive agent if needed and/or desired.

The force sensor 32 is attached to the attachment surface 76. The strain gauge 34 is attached to the attachment surface 76. The force sensor 32 is configured to measure the force applied to the rotational device 10 in an attachment state where the attachment surface 76 is attached to the additional attachment surface 14S of the rotational device 10.

The force sensor 32 is attached to the attachment surface 76 with an additional adhesive agent 80. The strain gauge 34 is attached to the attachment surface 76 with the additional adhesive agent 80. The flexible printed circuit 68 is attached to the attachment surface 76 with the additional adhesive agent 80. The flexible printed circuit 68 extends from the force sensor 32 to the circuit board 30C of the electronic controller EC1.

The force sensor 32 is provided between the housing 28 and the crank arm 14 in the attachment state. The force sensor 32 is provided between the attachment surface 76 and the additional attachment surface 14S in the attachment state. The force sensor 32 is entirely provided outside the internal space 74. The flexible printed circuit 68 is partially provided outside the internal space 74. The flexible printed circuit 68 is partially provided in the internal space 74.

The housing 28 includes a base plate 82. The base plate 82 at least partially defines the internal space 74. The base plate 82 includes the attachment surface 76. The base plate 82 partially defines the outer surface 70. The base plate 82 partially defines the inner surface 72. The housing 28 includes a cover 84. The base plate 82 and the cover 84 at least partially define the internal space 74. In the present embodiment, the base plate 82 entirely defines the internal space 74. The base plate 82 and the cover 84 entirely define the internal space 74. However, the base plate 82 can partially define the internal space 74 if needed and/or desired. The base plate 82 and the cover 84 can partially define the internal space 74 if needed and/or desired.

The base plate 82 is coupled to the cover 84. The base plate 82 is fastened to the cover 84 with a fastener such as a screw or an adhesive agent. For example, the base plate 82 is made of a metallic material or a resin material. The hardness of the base plate 82 is lower than the hardness of the crank arm 14. The base plate 82 includes an opening 82A. The flexible printed circuit 68 extends through the opening 82A. The cover 84 includes a cover recess 84A. The base plate 82 is at least partially provided in the cover recess 84A. The internal space 74 is at least partially provided in the cover recess 84A. In the present embodiment, the base plate 82 is entirely provided in the cover recess 84A. The internal space 74 is entirely provided in the cover recess 84A. However, the base plate 82 can be partially provided in the cover recess 84A if needed and/or desired. The internal space 74 can be partially provided in the cover recess 84A if needed and/or desired.

In the present embodiment, the base plate 82 is a separate member from the cover 84. However, the base plate 82 can be integrally provided with the cover 84 as a one-piece unitary member if needed and/or desired.

The position detector 38 is at least partially provided in the internal space 74. The wireless communicator WC1 is at least partially provided in the internal space 74. The electronic controller EC1 is at least partially provided in the internal space 74. The processor 30P is at least partially provided in the internal space 74. The memory 30M is at least partially provided in the internal space 74. The circuit board 30C is at least partially provided in the internal space 74. The electric power source 42 is at least partially provided in the internal space 74. The power-source holder 44 is at least partially provided in the internal space 74.

In the present embodiment, the position detector 38 is entirely provided in the internal space 74. The wireless communicator WC1 is entirely provided in the internal space 74. The electronic controller EC1 is entirely provided in the internal space 74. The processor 30P is entirely provided in the internal space 74. The memory 30M is entirely provided in the internal space 74. The circuit board 30C is entirely provided in the internal space 74. The electric power source 42 is entirely provided in the internal space 74. The power-source holder 44 is entirely provided in the internal space 74.

However, the position detector 38 can be partially provided in the internal space 74 if needed and/or desired. The wireless communicator WC1 can be partially provided in the internal space 74 if needed and/or desired. The electronic controller EC1 can be partially provided in the internal space 74 if needed and/or desired. The processor 30P can be partially provided in the internal space 74 if needed and/or desired. The memory 30M can be partially provided in the internal space 74 if needed and/or desired. The circuit board 30C can be partially provided in the internal space 74 if needed and/or desired. The electric power source 42 can be partially provided in the internal space 74 if needed and/or desired. The power-source holder 44 can be partially provided in the internal space 74 if needed and/or desired.

The electronic controller EC1 is coupled to the base plate 82. The circuit board 30C is coupled to the base plate 82. The electronic controller EC1 is fastened to the base plate 82 with a fastener such as a screw or an adhesive agent. The circuit board 30C is fastened to the base plate 82 with a fastener such as a screw or an adhesive agent.

The electronic controller EC1 is provided on the inner surface 72. The circuit board 30C is provided on the inner surface 72. In the present embodiment, the inner surface 72 includes a first inner surface 86 and a second inner surface 88. The base plate 82 includes the first inner surface 86. The first inner surface 86 is provided on a reverse side of the attachment surface 76. The cover 84 includes the second inner surface 88. The second inner surface 88 partially defines the internal space 74.

The electronic controller EC1 is provided on the first inner surface 86. The circuit board 30C is provided on the first inner surface 86. However, the electronic controller EC1 can be provided on the second inner surface 88 of the cover 84 if needed and/or desired. The circuit board 30C can be provided on the second inner surface 88 of the cover 84 if needed and/or desired.

The force sensor 32 and the housing 28 are attached to the crank assembly 13 with the adhesive agent 78. The force sensor 32 and the base plate 82 are attached to the crank assembly 13 with the adhesive agent 78. The force sensor 32 and the housing 28 are attached to the crank arm 14 with the adhesive agent 78. The force sensor 32 and the base plate 82 are attached to the crank arm 14 with the adhesive agent 78.

The force sensor 32 and the attachment surface 76 are attached to the crank assembly 13 with the adhesive agent 78. The force sensor 32 and the attachment surface 76 are attached to the crank arm 14 with the adhesive agent 78. The strain gauge 34 and the attachment surface 76 are attached to the crank assembly 13 with the adhesive agent 78. The strain gauge 34 and the attachment surface 76 are attached to the crank arm 14 with the adhesive agent 78. However, the force sensor 32 and the attachment surface 76 can be attached to another part of the crank assembly 13 (e.g., the crank axle 16, the crank arm 18) with the adhesive agent 78 if needed and/or desired.

The force sensor 32 is configured to be at least partially provided in the adhesive agent 78. The force sensor 32 is at least partially provided in the adhesive agent 78 in the attachment state. The flexible printed circuit 68 is configured to be at least partially provided in the adhesive agent 78. The flexible printed circuit 68 is at least partially provided in the adhesive agent 78 in the attachment state. In the present embodiment, the force sensor 32 is configured to be entirely provided in the adhesive agent 78. The flexible printed circuit 68 is configured to be partially provided in the adhesive agent 78. However, the force sensor 32 can be configured to be partially provided in the adhesive agent 78 if needed and/or desired. The flexible printed circuit 68 can be configured to be entirely provided in the adhesive agent 78 if needed and/or desired.

The force sensor 32 is in contact with the adhesive agent 78 in the attachment state. The strain gauge 34 is in contact with the adhesive agent 78 in the attachment state. The flexible printed circuit 68 is in contact with the adhesive agent 78 in the attachment state. The attachment surface 76 is in contact with the adhesive agent 78 in the attachment state.

The force sensor 32 is in contact with the additional adhesive agent 80 in the attachment state. The strain gauge 34 is in contact with the additional adhesive agent 80 in the attachment state. The flexible printed circuit 68 is in contact with the additional adhesive agent 80 in the attachment state.

The outer surface 70 includes a first outer surface 90 and a second outer surface 92. The cover 84 includes the first outer surface 90 and the second outer surface 92. The first outer surface 90 is attached to the additional attachment surface 14S with the adhesive agent 78. The first outer surface 90 is in contact with the adhesive agent 78 in the attachment state. The second outer surface 92 is provided on a reverse side of the second inner surface 88 of the inner surface 72.

Figure 5:
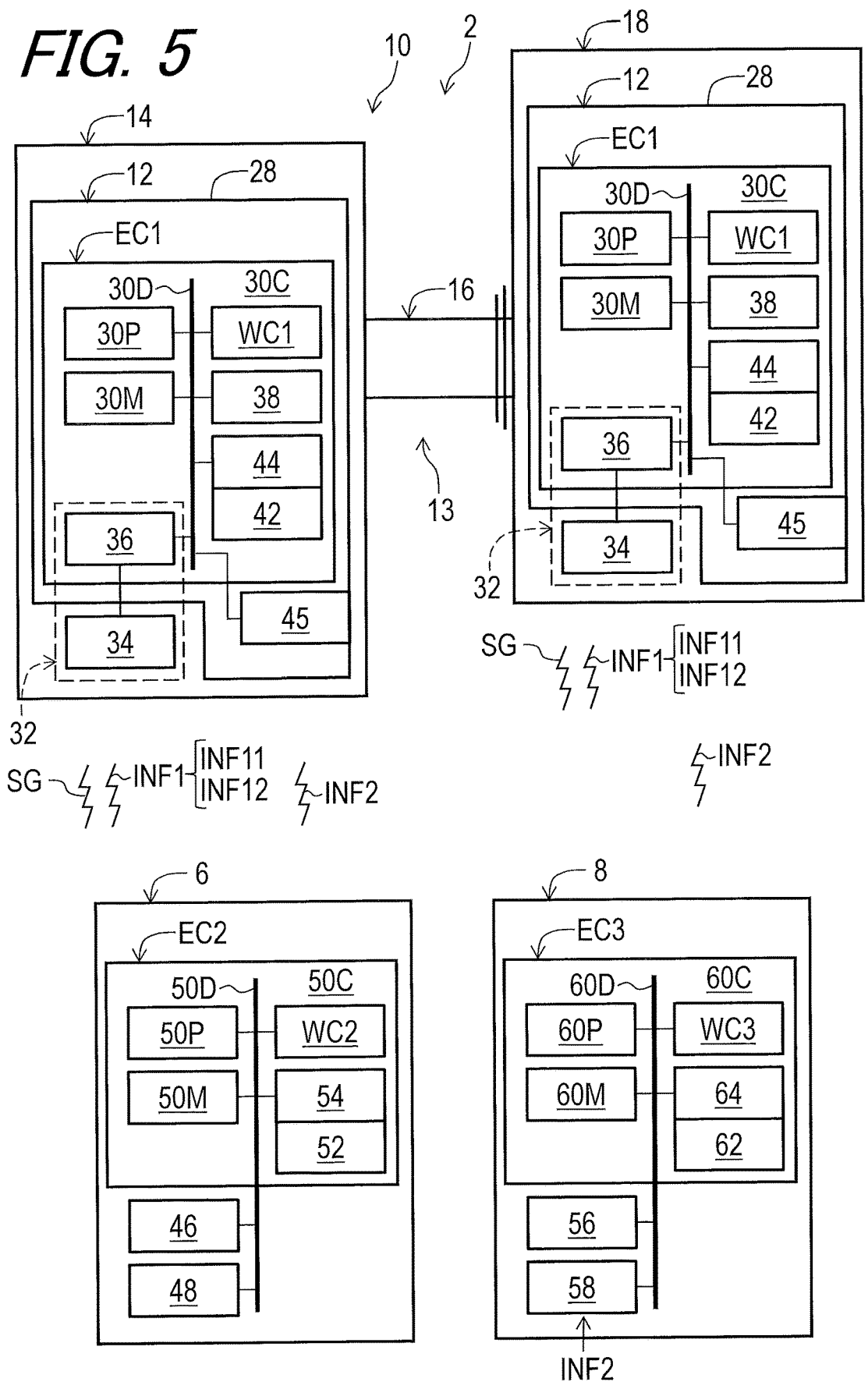
FIG. 5 is a schematic block diagram of a rotational device in accordance with a modification.
Figure 6:
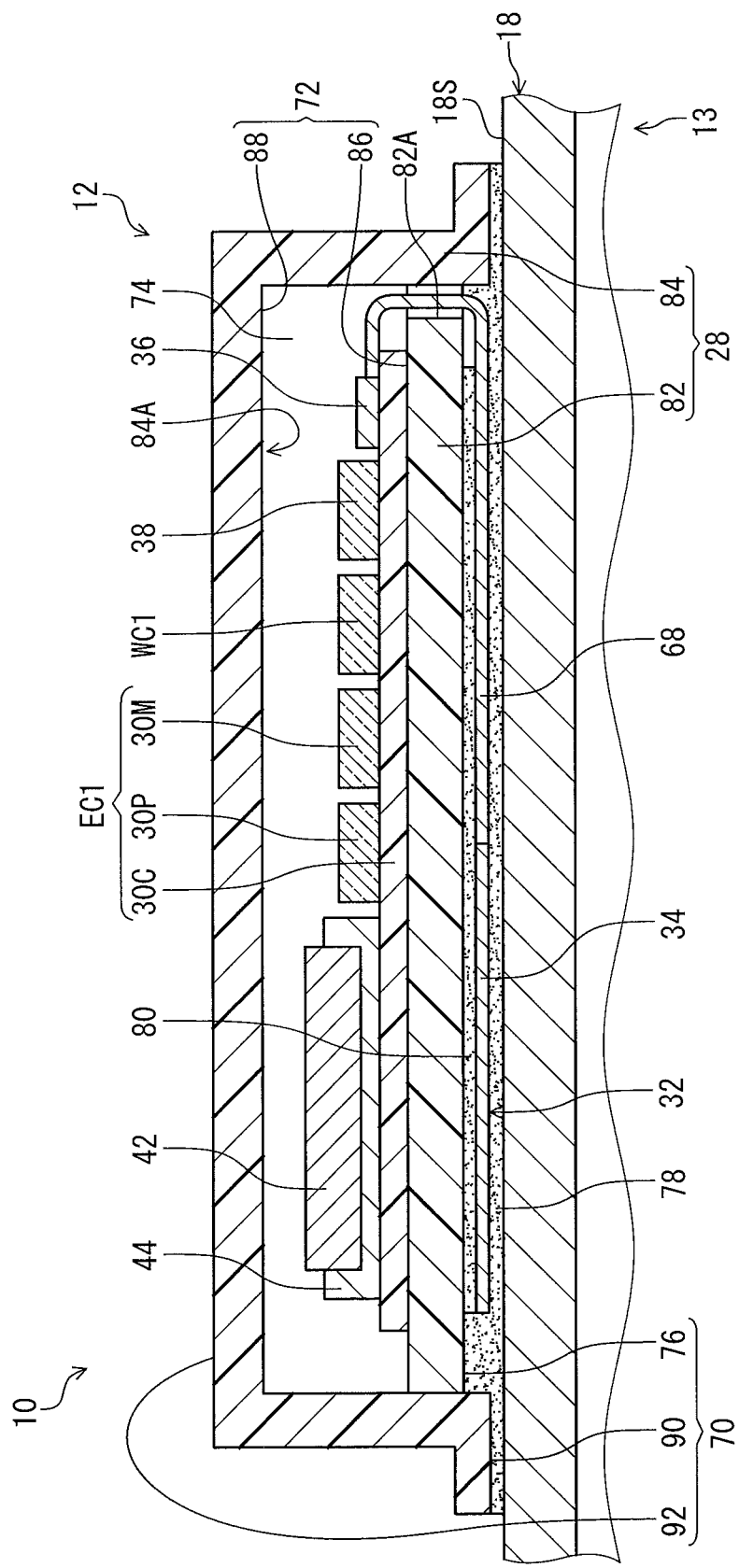
FIG. 6 is a schematic cross-sectional view of the rotational device illustrated in FIG. 5.

As seen in FIG. 5, the electrical device 12 can be provided to the crank arm 18 if needed and/or desired. In such embodiments, the rotational device 10 includes at least one of the electrical device 12 provided to the crank arm 14 and the electrical device 12 provided to the crank arm 18. The electrical device 12 provided to the crank arm 18 is configured to wirelessly transmit the rotational information INF1 of the crank arm 18 while the electrical device 12 provided to the crank arm 14 is configured to wirelessly transmit the rotational information INF1 of the crank arm 14. The additional electrical device 6 is configured to separately display the power INF11 applied to the crank arm 14 and the power INF11 applied to the crank arm 18. The additional electrical device 6 is configured to display one of the rotational speed INF12 of the crank arm 14 and the rotational speed INF12 of the crank arm 18. The additional electrical device 6 can be configured to display an average value of the rotational speed INF12 of the crank arm 14 and the rotational speed INF12 of the crank arm 18. As seen in FIG. 6, the crank arm 18 includes an additional attachment surface 18S. The attachment surface 76 is configured to be attached to the additional attachment surface 18S of the rotational device 10 with the adhesive agent 78. The attachment surface 76 is configured to be attached to the additional attachment surface 18S of the crank arm 18 with the adhesive agent 78.

Second Embodiment

A rotational device 210 in accordance with a second embodiment will be described below referring to FIGS. 7 to 9. The rotational device 210 has the same structure and/or configuration as those of the rotational device 10 except for the arrangement of the electrical device 12. Thus, elements having substantially the same function as those in the first embodiment will be numbered the same here and will not be described and/or illustrated again in detail here for the sake of brevity.

Figure 7:
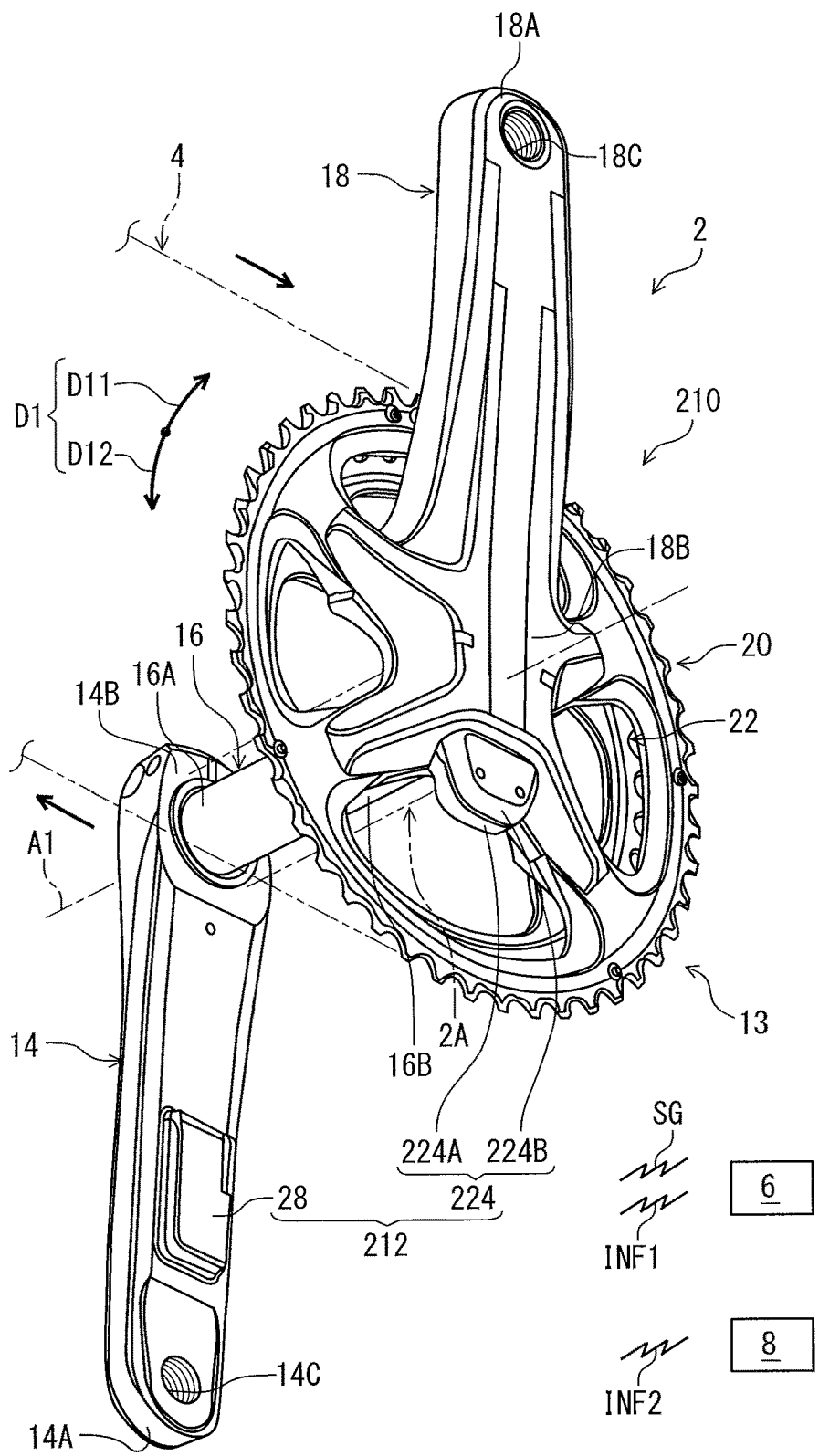
FIG. 7 is a perspective view of a rotational device in accordance with a second embodiment.

As seen in FIGS. 7 and 8, the rotational device 210 comprises the crank arm 14, the crank arm 18, and the crank axle 16. The rotational device 210 for the human-powered vehicle 2 comprises an electrical device 212. The electrical device 212 has substantially the same structure as the structure of the electrical device 12 of the first embodiment. The electrical device 212 is at least partially provided to at least one of the crank axle 16, the crank arm 14, and the sprocket 20 and/or 22. The electrical device 212 is at least partially provided to the crank arm 14.

As seen in FIG. 8, the electrical device 212 is partially provided to the crank arm 14, partially provided to the crank axle 16, and partially provided to the crank arm 18. The wireless communicator WC1, the electronic controller EC1, the force sensor 32, and the position detector 38 are provided to the crank arm 14. The electric power source 42 and the power-source holder 44 are provided to the crank axle 16. The electric connector port 45 is provided to the crank arm 18. The power-source holder 44 is electrically connected to the electronic controller EC1 and the electric connector port 45 via an electric cable.

As seen in FIG. 7, the electrical device 212 includes the housing 28 and an additional housing 224. The additional housing 224 is attached to the crank arm 18. The electric connector port 45 is coupled to the additional housing 224. For example, the additional housing 224 includes a housing body 224A and a lid 224B. The housing body 224A is secured to the crank arm 18. The lid 224B is detachably attached to the housing body 224A to cover the electric connector port 45 at least partially. The electric connector port 45 is connectable to an electric cable to charge the electric power source 42 via the electric connector port 45 and the power-source holder 44.

Figure 9:
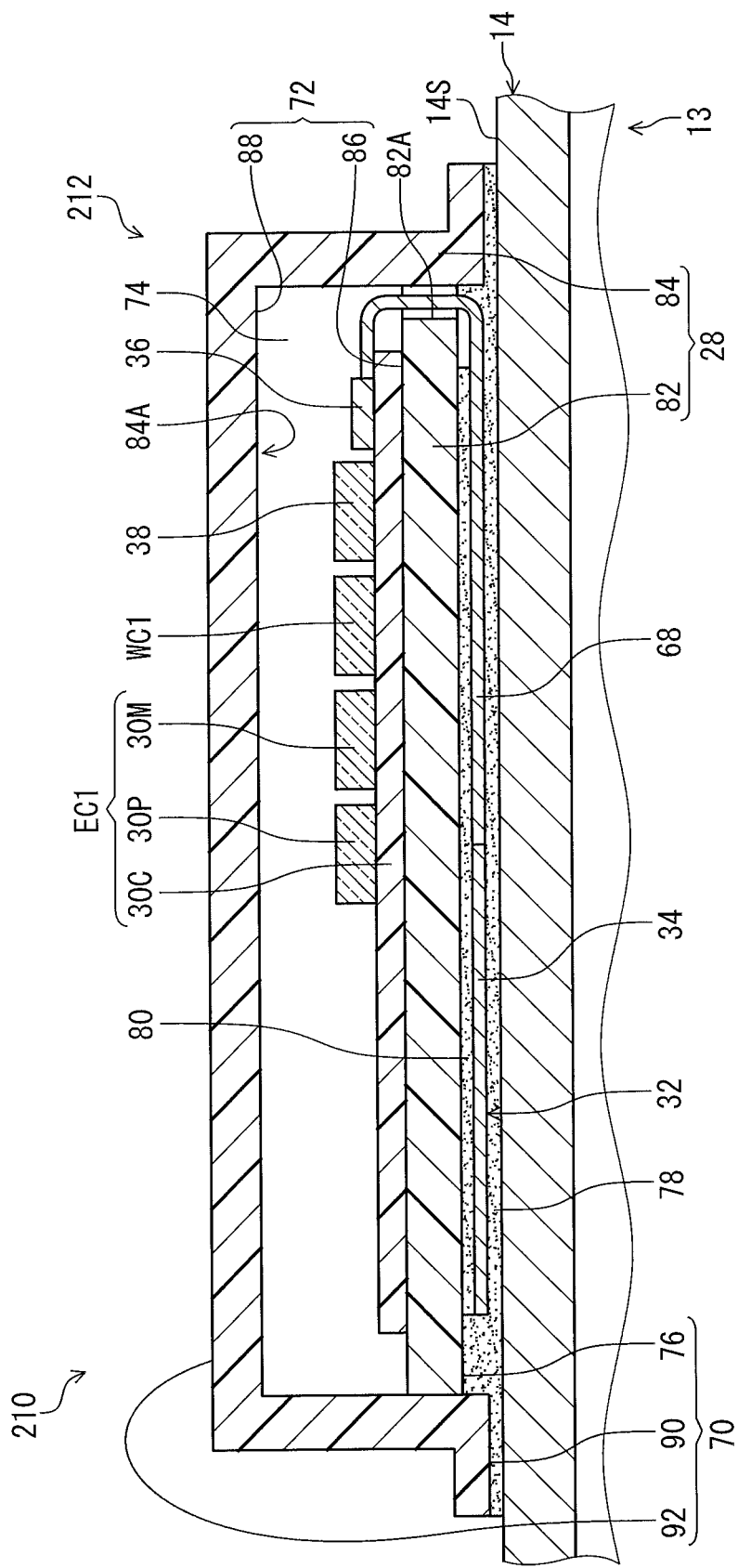
FIG. 9 is a schematic cross-sectional view of the rotational device illustrated in FIG. 7.

As seen in FIG. 9, the attachment surface 76 is configured to be attached to the additional attachment surface 14S of the rotational device 210 with the adhesive agent 78. The attachment surface 76 is configured to be attached to the additional attachment surface 14S of the crank arm 14 with the adhesive agent 78. The force sensor 32 is configured to measure the force applied to the rotational device 210 in the attachment state where the attachment surface 76 is attached to the additional attachment surface 14S of the rotational device 210.

Figure 10:
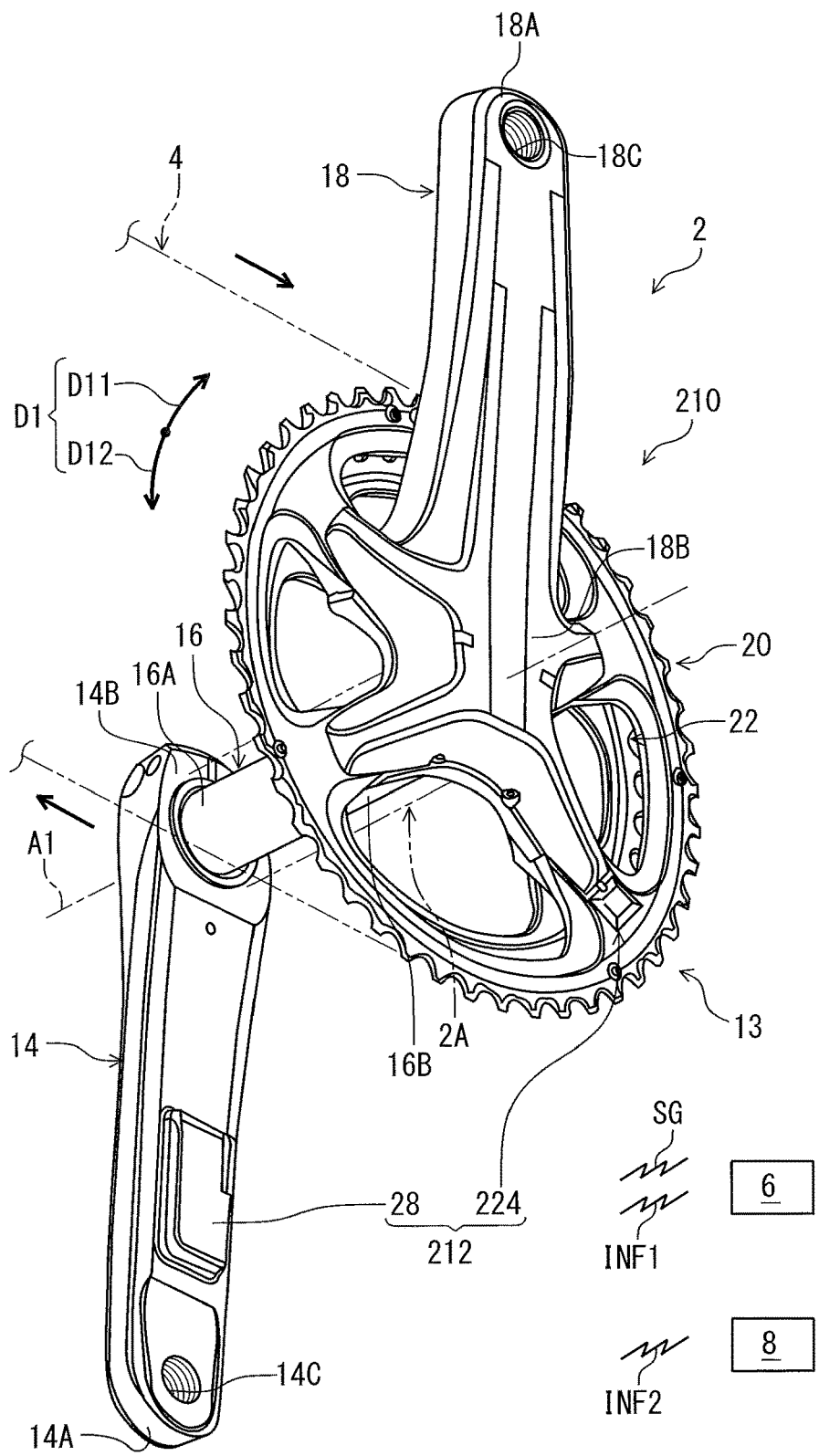
FIG. 10 is a perspective view of a rotational device in accordance with a modification.

As seen in the modification depicted in FIG. 10, the electrical device 212 can be at least partially provided to the sprocket 20 if needed and/or desired. The additional housing 224 can be attached to the sprocket 20 if needed and/or desired.

Third Embodiment

A rotational device 310 in accordance with a third embodiment will be described below referring to FIGS. 11 to 15. The rotational device 310 has the same structure and/or configuration as those of the rotational device 210 except for an additional force sensor. Thus, elements having substantially the same function as those in the first and second embodiments will be numbered the same here and will not be described and/or illustrated again in detail here for the sake of brevity.

Figure 11:
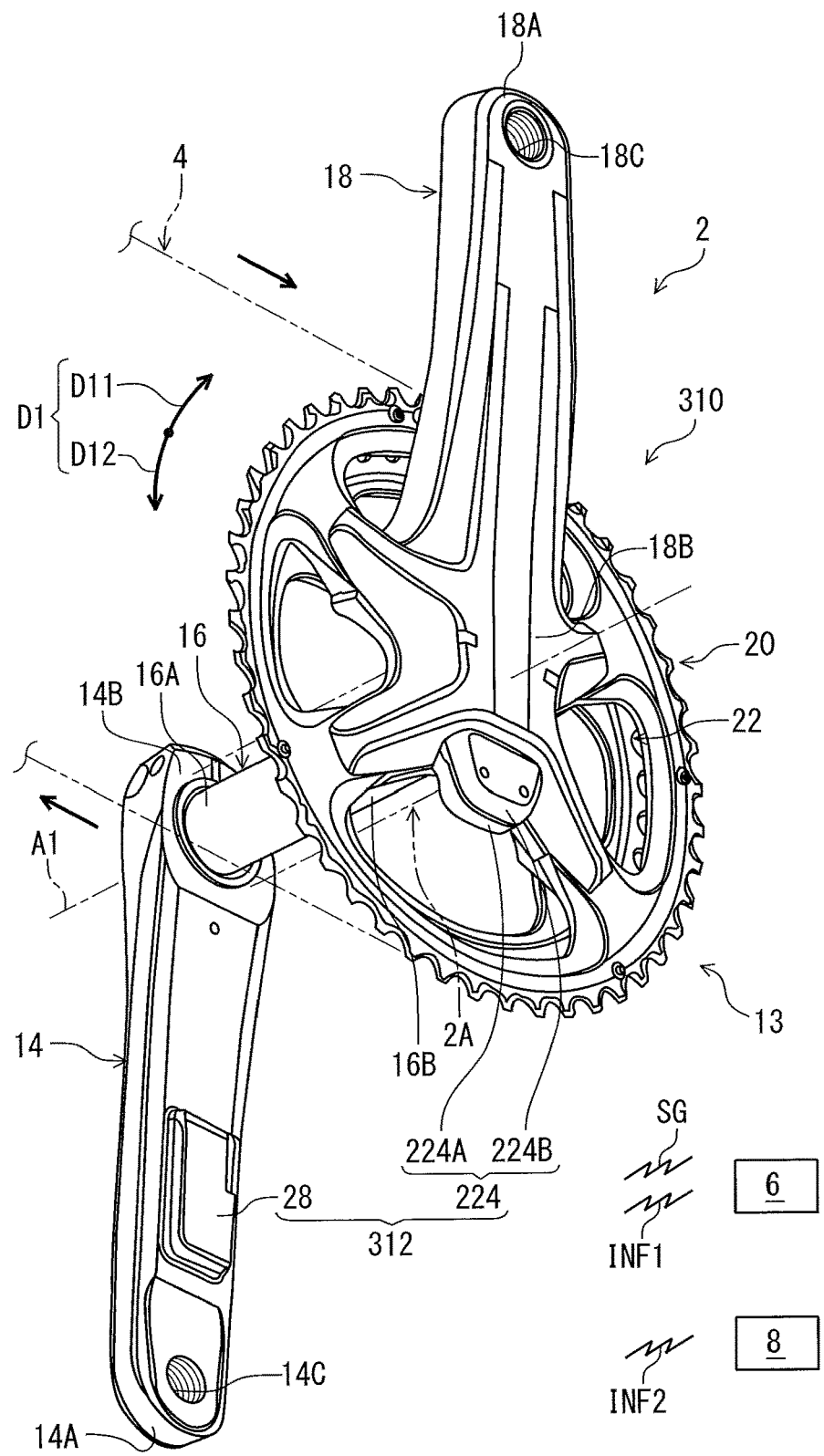
FIG. 11 is a perspective view of a rotational device in accordance with a third embodiment.

As seen in FIGS. 11 and 12, the rotational device 310 comprises the crank arm 14, the crank arm 18, and the crank axle 16. The rotational device 310 includes the crank assembly 13. The rotational device 310 for the human-powered vehicle 2 comprises an electrical device 312. The electrical device 312 has substantially the same structure as the structure of the electrical device 212 of the second embodiment. The electrical device 312 is at least partially provided to at least one of the crank axle 16, the crank arm 14, and the sprocket 20 and/or 22. The electrical device 312 is at least partially provided to the crank arm 14.

As seen in FIG. 12, the electrical device 312 is partially provided to the crank arm 14, partially provided to the crank axle 16, and partially provided to the crank arm 18. The wireless communicator WC1, the electronic controller EC1, the force sensor 32, and the position detector 38 are provided to the crank arm 14. The electric power source 42 and the power-source holder 44 are provided to the crank axle 16. The electric connector port 45 is provided to the crank arm 18. The power-source holder 44 is electrically connected to the electronic controller EC1 via an electric cable. The power-source holder 44 is electrically connected to the electric connector port 45 via an electric cable.

The wireless communicator WC1 is configured to wirelessly transmit the rotational information INF1 relating to the rotational device 310. The rotational information INF1 includes the power INF11 and the rotational speed INF12 of the rotational device 310 (e.g., the crank arm 14). Furthermore, the wireless communicator WC1 is configured to wirelessly transmit rotational information INF3 relating to the rotational device 310 (e.g., the crank arm 18).

The electrical device 312 for the rotational device 310 of the human-powered vehicle 2 comprises a force sensor 332. The force sensor 332 is configured to obtain the rotational information INF3. The rotational information INF3 includes a force applied to the rotational device 310 (e.g., the crank arm 18) in the rotational direction D1 (see e.g., FIG. 11). Thus, the force sensor 332 is configured to measure the force applied to the rotational device 310. The force sensor 332 is configured to output a measurement value indicating the force applied to the rotational device 310 in the rotational direction D1. In the present embodiment, the force sensor 332 is configured to measure the force applied to the crank arm 18. However, the force sensor 332 can be configured to measure the force applied to another part of the rotational device 310 if needed and/or desired.

The electronic controller EC1 is configured to receive the rotational information INF3 obtained by the force sensor 332. The electronic controller EC1 is electrically connected to the force sensor 332 to receive the rotational information INF3 obtained by the force sensor 332. The electronic controller EC1 is configured to receive the force measured by the force sensor 332. The electronic controller EC1 is electrically connected to the force sensor 332 to receive the force measured by the force sensor 332.

For example, the force sensor 332 includes a strain gauge 334 and a measurement circuit 336. The strain gauge 334 is attached to the crank arm 18. The strain gauge 334 is configured to output a change in electrical resistance depending on the deformation amount of the rotational device 310. The strain gauge 334 is configured to output the change in the electrical resistance depending on the deformation amount of the crank arm 18. The measurement circuit 336 is electrically connected to the strain gauge 334 to convert the output of the strain gauge 334 to a voltage indicating the deformation amount of the rotational device 310 (e.g., the crank arm 18). For example, the measurement circuit 336 constitutes a bridge circuit with the strain gauge 334.

The measurement circuit 336 is electrically connected to the electronic controller EC1. The electrical device 312 includes a circuit board 330C provided to the crank arm 18. The electronic controller EC1, the power-source holder 44, and the electric connector port 45 are electrically connected to the circuit board 330C. The measurement circuit 336 is electrically mounted on the circuit board 330C. For example, the measurement circuit 336 is electrically connected to strain gauge 334 via an additional circuit board such as a flexible printed circuit. The electronic controller EC1 is electrically connected to the measurement circuit 336 to receive the rotational information INF3. The electronic controller EC1 is electrically connected to the measurement circuit 336 to receive the rotational information INF3. The electronic controller EC1 is electrically connected to the measurement circuit 336 to receive the deformation amount of the rotational device 310 (e.g., the crank arm 18).

Figure 13:
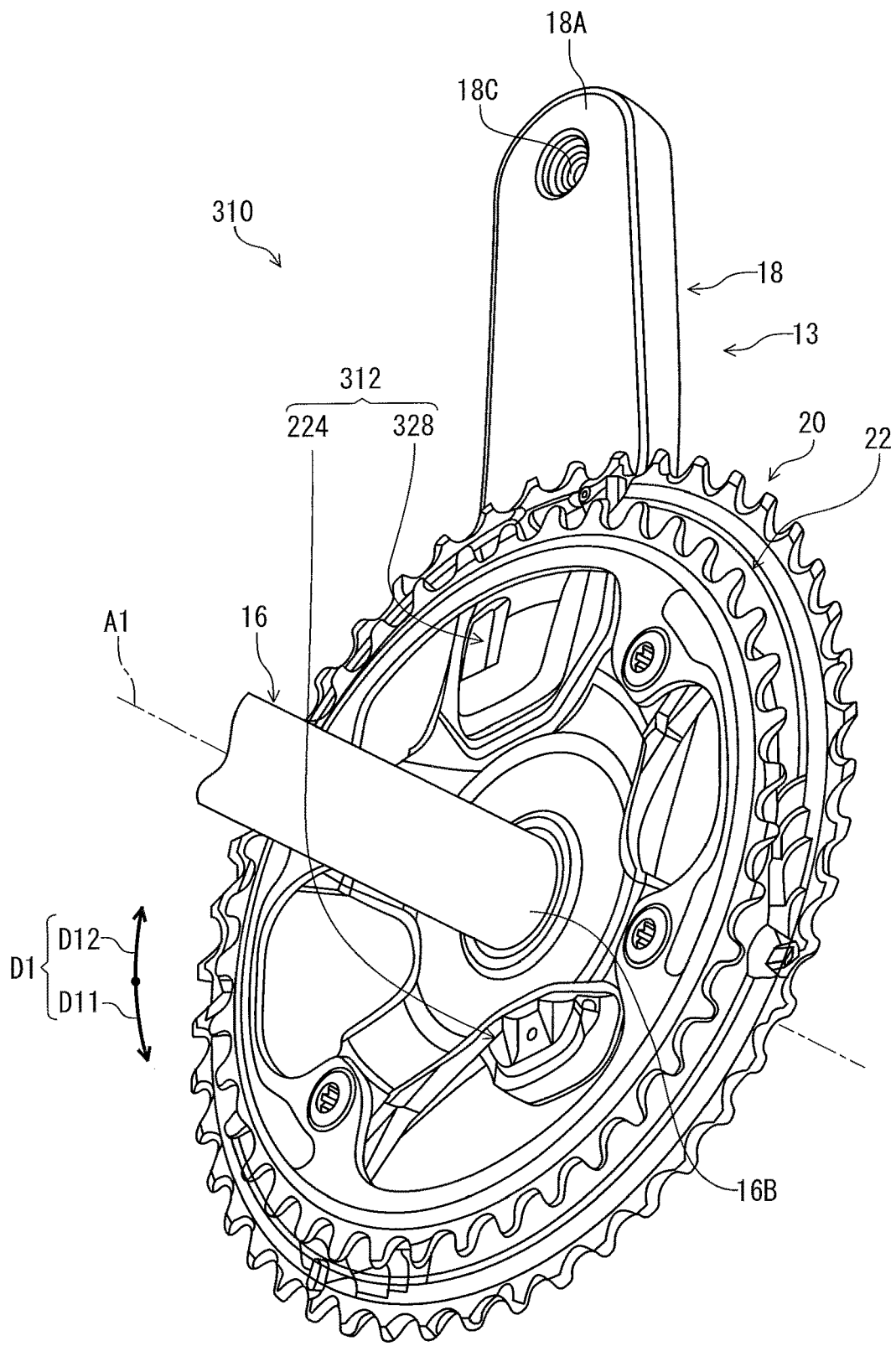
FIG. 13 is another perspective view of the rotational device illustrated in FIG. 11.

As seen in FIGS. 11 and 13, the electrical device 312 includes the housing 28, the additional housing 224, and an housing 328. The housing 328 is attached to the crank arm 18. The electric connector port 45 can be coupled to the housing 328 if needed and/or desired. In such embodiments, the additional housing 224 can be omitted from the electrical device 312.

As seen in FIG. 12, as with the first embodiment, the electronic controller EC1 is configured to calculate the rotational information INF1 (e.g., the power INF11, the rotational speed INF12). In addition, the electronic controller EC1 is configured to calculate the rotational information INF3 based on the deformation amount of the rotational device 310 (e.g., the crank arm 18) obtained by the force sensor 332. The electronic controller EC1 is configured to calculate the force (e.g., torque) applied to the rotational device 310 based on the deformation amount of the rotational device 310 (e.g., the crank arm 18) obtained by the force sensor 332. The rotational information INF3 includes power INF31 applied to the rotational device 310 and the rotational speed INF12. For example, the electronic controller EC1 is configured to calculate the power INF31 applied to the rotational device 310 based on the torque applied to the rotational device 310 (e.g., the crank arm 18) and the rotational speed INF12 of the rotational device 310. However, the electronic controller EC1 can be configured to calculate the power INF31 applied to the rotational device 310 based on other data if needed and/or desired. For example, the electronic controller EC1 can be configured to calculate an average of the power INF31 during one revolution of the crank arm 18.

The electronic controller EC1 is configured to control the wireless communicator WC1 to wirelessly transmit the rotational information INF3 obtained by the force sensor 332. The electronic controller EC1 is configured to control the wireless communicator WC1 to wirelessly transmit, as the rotational information INF3, the power INF31 calculated by the electronic controller EC1 based on the force detected by the force sensor 332.

Figure 14:
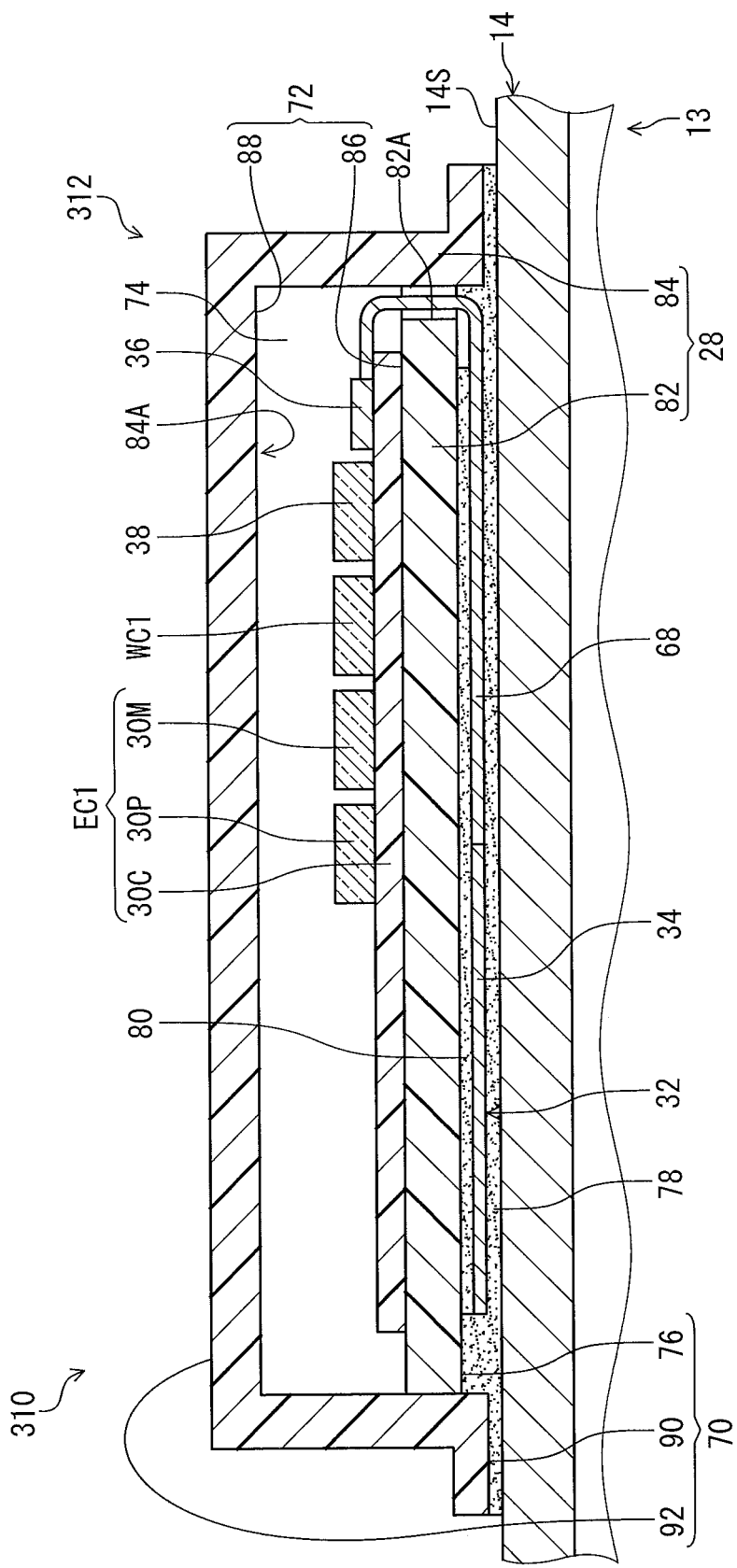
FIG. 14 is a schematic cross-sectional view of the rotational device illustrated in FIG. 11.

As seen in FIG. 14, as with the first embodiment, the attachment surface 76 is configured to be attached to the additional attachment surface 14S of the rotational device 310 with the adhesive agent 78. The attachment surface 76 is configured to be attached to the additional attachment surface 14S of the crank arm 14 with the adhesive agent 78. The force sensor 32 is configured to measure the force applied to the rotational device 310 in the attachment state where the attachment surface 76 is attached to the additional attachment surface 14S of the rotational device 310.

Figure 15:
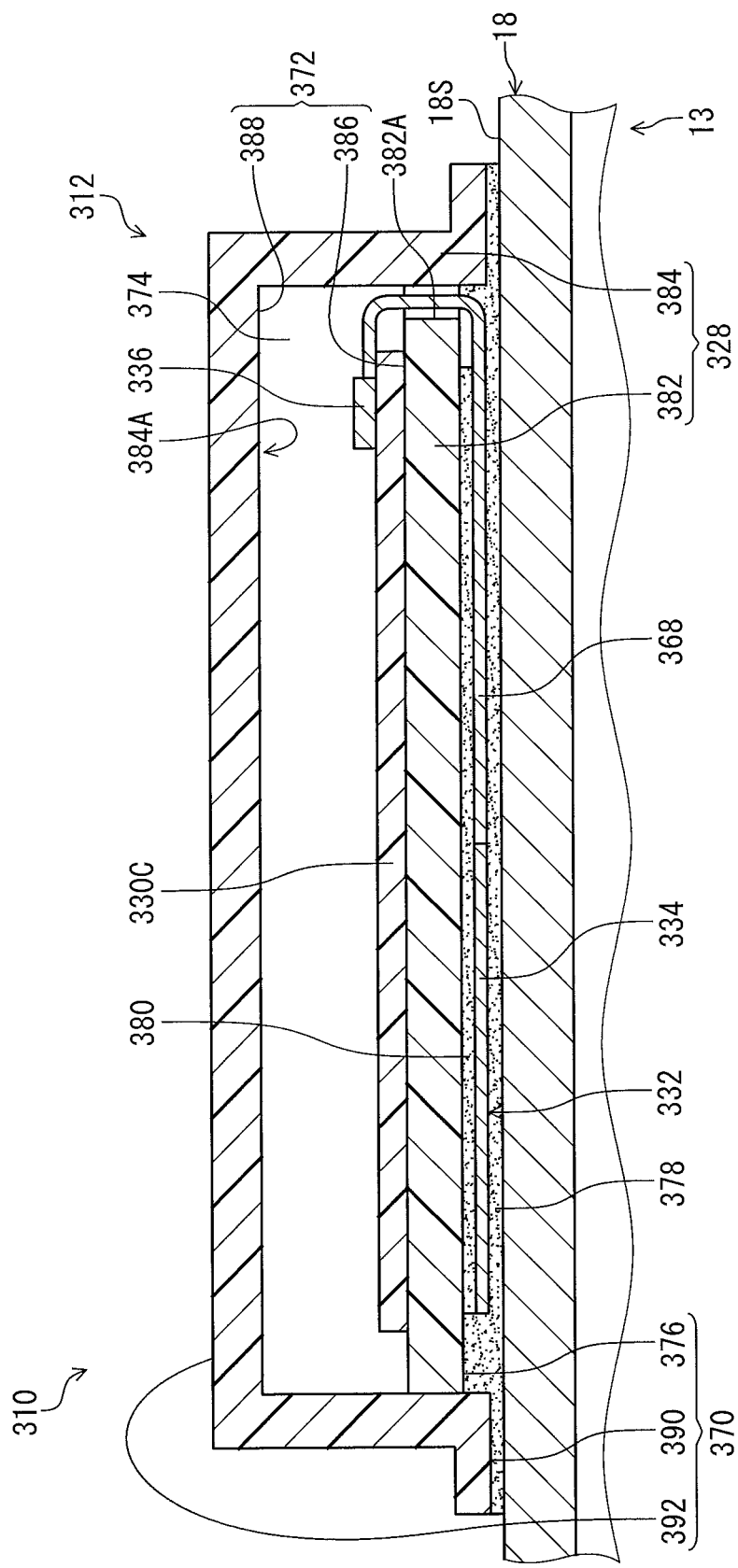
FIG. 15 is a schematic cross-sectional view of the rotational device illustrated in FIG. 13.

As seen in FIG. 15, the electrical device 312 further comprises a flexible printed circuit 368. The flexible printed circuit 368 electrically connects the force sensor 332 and the electronic controller EC1. The flexible printed circuit 368 electrically connects the strain gauge 334 and the measurement circuit 336. The measurement circuit 336 is electrically mounted on the circuit board 330C of the electronic controller EC1. Thus, the flexible printed circuit 368 electrically connects the force sensor 332 and the circuit board 330C of the electronic controller EC1.

The housing 328 includes an outer surface 370 and an inner surface 372. The inner surface 372 defines an internal space 374. The housing 328 is configured to be attached to an additional attachment surface 18S of the rotational device 310 with an adhesive agent 378. The outer surface 370 is configured to be attached to the additional attachment surface 18S of the rotational device 310 with the adhesive agent 378. The outer surface 370 includes an attachment surface 376. The attachment surface 376 is configured to be attached to the additional attachment surface 18S of the rotational device 310 with the adhesive agent 378.

In the present embodiment, the crank arm 18 includes the additional attachment surface 18S. The attachment surface 376 is configured to be attached to the additional attachment surface 18S of the crank arm 18 with the adhesive agent 378. However, the attachment surface 376 can be configured to be attached to an additional attachment surface of another part of the rotational device 310 with an adhesive agent if needed and/or desired.

The force sensor 332 is attached to the attachment surface 376. The strain gauge 334 is attached to the attachment surface 376. The force sensor 332 is configured to measure the force applied to the rotational device 310 in an attachment state where the attachment surface 376 is attached to the additional attachment surface 18S of the rotational device 310.

The force sensor 332 is attached to the attachment surface 376 with an additional adhesive agent 380. The strain gauge 334 is attached to the attachment surface 376 with the additional adhesive agent 380. The flexible printed circuit 368 is attached to the attachment surface 376 with the additional adhesive agent 380. The flexible printed circuit 368 extends from the force sensor 332 to the circuit board 330C of the electronic controller EC1.

The force sensor 332 is provided between the housing 328 and the crank arm 18 in the attachment state. The force sensor 332 is provided between the attachment surface 376 and the additional attachment surface 18S in the attachment state. The force sensor 332 is entirely provided outside the internal space 374. The flexible printed circuit 368 is partially provided outside the internal space 374. The flexible printed circuit 368 is partially provided in the internal space 374.

The housing 328 includes a base plate 382. The base plate 382 at least partially defines the internal space 374. The base plate 382 includes the attachment surface 376. The base plate 382 partially defines the outer surface 370. The base plate 382 partially defines the inner surface 372. The housing 328 includes a cover 384. The base plate 382 and the cover 384 at least partially define the internal space 374. In the present embodiment, the base plate 382 entirely defines the internal space 374. The base plate 382 and the cover 384 entirely define the internal space 374. However, the base plate 382 can partially define the internal space 374 if needed and/or desired. The base plate 382 and the cover 384 can partially define the internal space 374 if needed and/or desired.

The base plate 382 is coupled to the cover 384. The base plate 382 is fastened to the cover 384 with a fastener such as a screw or an adhesive agent. The base plate 382 includes an opening 382A. The flexible printed circuit 368 extends through the opening 382A. The cover 384 includes a cover recess 384A. The base plate 382 is at least partially provided in the cover recess 384A. The internal space 374 is at least partially provided in the cover recess 384A. In the present embodiment, the base plate 382 is entirely provided in the cover recess 384A. The internal space 374 is entirely provided in the cover recess 384A. However, the base plate 382 can be partially provided in the cover recess 384A if needed and/or desired. The internal space 374 can be partially provided in the cover recess 384A if needed and/or desired.

In the present embodiment, the base plate 382 is a separate member from the cover 384. However, the base plate 382 can be integrally provided with the cover 384 as a one-piece unitary member if needed and/or desired.

The circuit board 330C is at least partially provided in the internal space 374. In the present embodiment, the circuit board 330C is entirely provided in the internal space 374. However, the circuit board 330C can be partially provided in the internal space 374 if needed and/or desired.

The circuit board 330C is coupled to the base plate 382. The circuit board 330C is fastened to the base plate 382 with a fastener such as a screw or an adhesive agent.

The circuit board 330C is provided on the inner surface 372. In the present embodiment, the inner surface 372 includes a first inner surface 386 and a second inner surface 388. The base plate 382 includes the first inner surface 386. The first inner surface 386 is provided on a reverse side of the attachment surface 376. The cover 384 includes the second inner surface 388. The second inner surface 388 partially defines the internal space 374.

The electronic controller EC1 is provided on the first inner surface 386. The circuit board 330C is provided on the first inner surface 386. However, the electronic controller EC1 can be provided on the second inner surface 388 of the cover 384 if needed and/or desired. The circuit board 330C can be provided on the second inner surface 388 of the cover 384 if needed and/or desired.

The force sensor 332 and the housing 328 are attached to the crank assembly 13 with the adhesive agent 378. The force sensor 332 and the base plate 382 are attached to the crank assembly 13 with the adhesive agent 378. The force sensor 332 and the housing 328 are attached to the crank arm 18 with the adhesive agent 378. The force sensor 332 and the base plate 382 are attached to the crank arm 18 with the adhesive agent 378.

The force sensor 332 and the attachment surface 376 are attached to the crank assembly 13 with the adhesive agent 378. The force sensor 332 and the attachment surface 376 are attached to the crank arm 18 with the adhesive agent 378. The strain gauge 334 and the attachment surface 376 are attached to the crank assembly 13 with the adhesive agent 378. The strain gauge 334 and the attachment surface 376 are attached to the crank arm 18 with the adhesive agent 378. However, the force sensor 332 and the attachment surface 376 can be attached to another part of the crank assembly 13 (e.g., the crank axle 16, the crank arm 18) with the adhesive agent 378 if needed and/or desired.

The force sensor 332 is configured to be at least partially provided in the adhesive agent 378. The force sensor 332 is at least partially provided in the adhesive agent 378 in the attachment state. The flexible printed circuit 368 is configured to be at least partially provided in the adhesive agent 378. The flexible printed circuit 368 is at least partially provided in the adhesive agent 378 in the attachment state. In the present embodiment, the force sensor 332 is configured to be entirely provided in the adhesive agent 378. The flexible printed circuit 368 is configured to be partially provided in the adhesive agent 378. However, the force sensor 332 can be configured to be partially provided in the adhesive agent 378 if needed and/or desired. The flexible printed circuit 368 can be configured to be entirely provided in the adhesive agent 378 if needed and/or desired.

The force sensor 332 is in contact with the adhesive agent 378 in the attachment state. The strain gauge 334 is in contact with the adhesive agent 378 in the attachment state. The flexible printed circuit 368 is in contact with the adhesive agent 378 in the attachment state. The attachment surface 376 is in contact with the adhesive agent 378 in the attachment state.

The force sensor 332 is in contact with the additional adhesive agent 380 in the attachment state. The strain gauge 334 is in contact with the additional adhesive agent 380 in the attachment state. The flexible printed circuit 368 is in contact with the additional adhesive agent 380 in the attachment state.

The outer surface 370 includes a first outer surface 390 and a second outer surface 392. The cover 384 includes the first outer surface 390 and the second outer surface 392. The first outer surface 390 is attached to the additional attachment surface 18S with the adhesive agent 378. The first outer surface 390 is in contact with the adhesive agent 378 in the attachment state. The second outer surface 392 is provided on a reverse side of the second inner surface 388 of the inner surface 372.

Fourth Embodiment

A rotational device 410 in accordance with a fourth embodiment will be described below referring to FIGS. 16 to 19. The rotational device 410 has the same structure and/or configuration as those of the rotational device 10 except that an electrical device is provided to the pedal 24. Thus, elements having substantially the same function as those in the first to third embodiments will be numbered the same here and will not be described and/or illustrated again in detail here for the sake of brevity.

Figure 16:
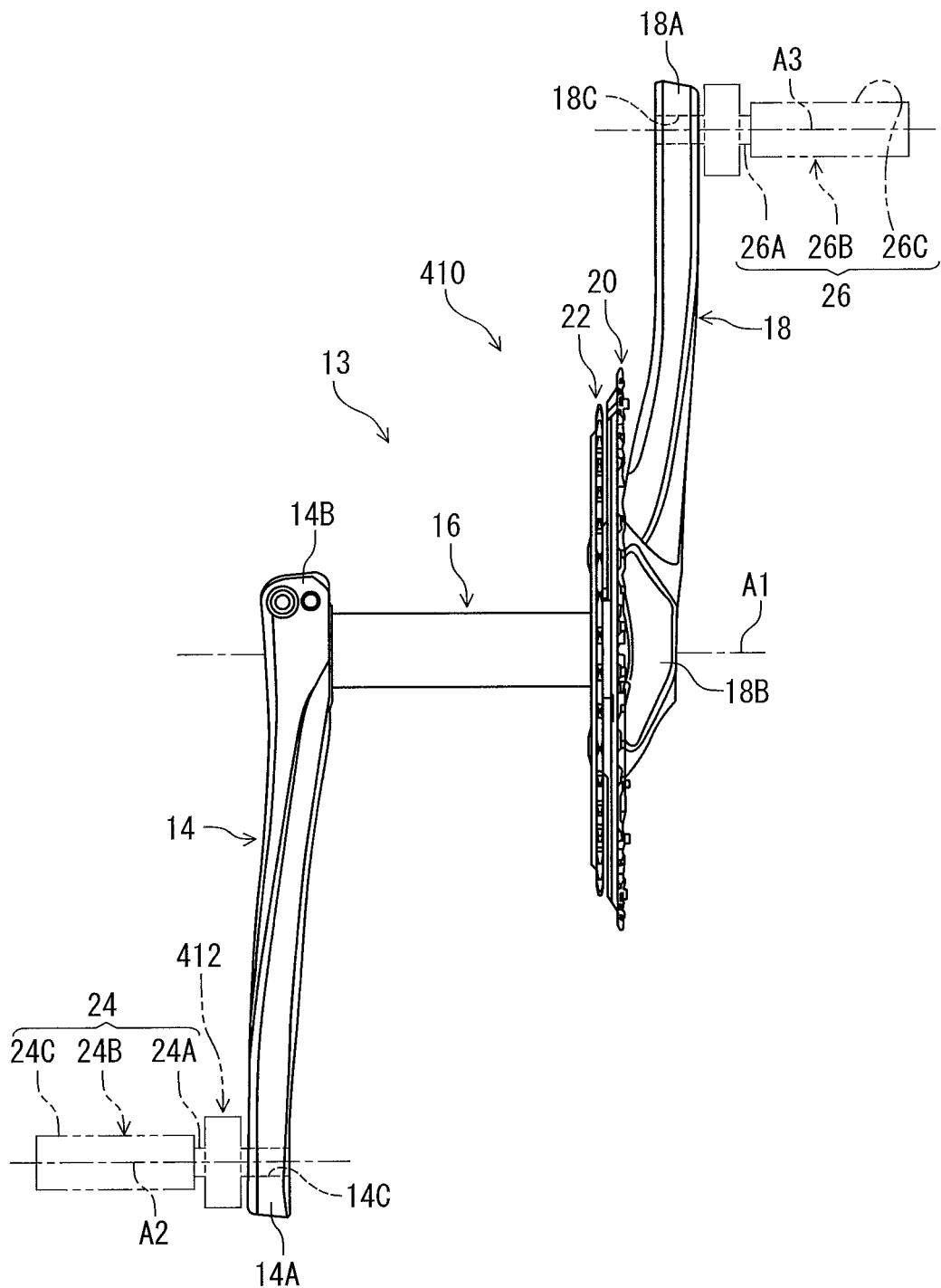
FIG. 16 is a side-elevational view of a rotational device in accordance with a fourth embodiment.
Figure 17:
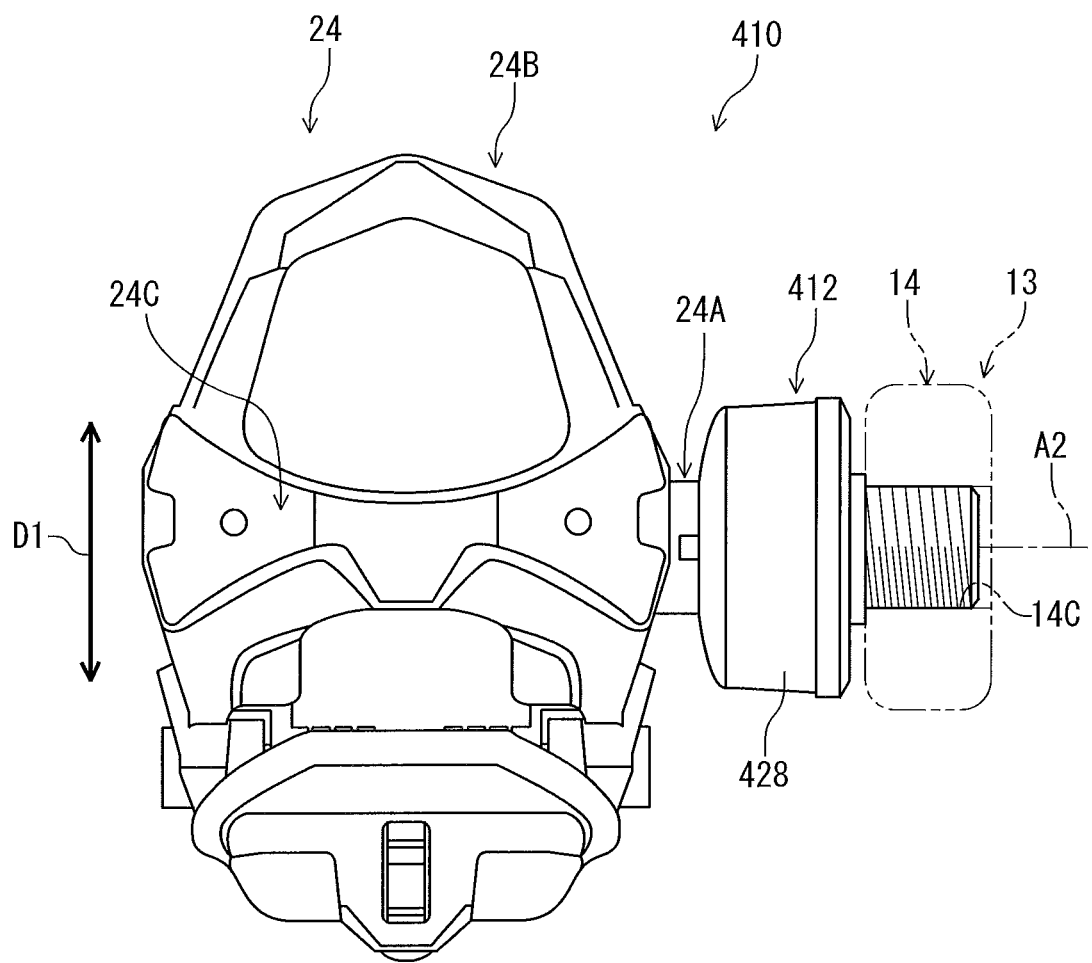
FIG. 17 is a top view of the rotational device illustrated in FIG. 16.

As seen in FIGS. 16 and 17, the rotational device 410 for the human-powered vehicle 2 comprises the crank assembly 13 and the pedal 24. Namely, the rotational device 410 for the human-powered vehicle 2 comprises the pedal axle 24A and the pedal body 24B. The rotational device 410 for the human-powered vehicle 2 comprises an electrical device 412. The electrical device 412 has substantially the same structure as the structure of the electrical device 12 of the second embodiment.

The electrical device 412 is at least partially provided to at least one of the pedal axle 24A and the pedal body 24B. The electrical device 412 is at least partially provided to the pedal axle 24A. In the present embodiment, the electrical device 412 is entirely provided to the pedal axle 24A. However, the electrical device 412 can be at least partially provided to at least one of the pedal axle 24A and the pedal body 24B if needed and/or desired. The electrical device 412 can be at least partially provided to the pedal 26 if needed and/or desired.

As seen in FIG. 18, the electrical device 412 comprises the wireless communicator WC1, the electronic controller EC1, the force sensor 32, the position detector 38, the electric power source 42, the power-source holder 44, and the electric connector port 45. The wireless communicator WC1, the electronic controller EC1, the force sensor 32, the position detector 38, the electric power source 42, the power-source holder 44, and the electric connector port 45 are provided to the pedal axle 24B.

The wireless communicator WC1 is configured to wirelessly transmit rotational information INF4 relating to the rotational device 410 (e.g., the pedal 24). The force sensor 32 is configured to obtain the rotational information INF4. The force sensor 32 is configured to output a measurement value indicating the force applied to the rotational device 410 in the rotational direction D1 (see e.g., FIG. 17).

The electronic controller EC1 is configured to receive the rotational information INF4 obtained by the force sensor 32. The electronic controller EC1 is electrically connected to the force sensor 32 to receive the rotational information INF4 obtained by the force sensor 32.

The rotational information INF4 includes power INF41 applied to the rotational device 410 and a rotational speed INF42 of the rotational device 410. For example, the electronic controller EC1 is configured to calculate the power INF41 applied to the rotational device 410 based on the torque applied to the rotational device 410 (e.g., the pedal 24) and the rotational speed INF42 of the rotational device 410. However, the electronic controller EC1 can be configured to calculate the power INF41 applied to the rotational device 410 based on other data if needed and/or desired. For example, the electronic controller EC1 can be configured to calculate an average of the power INF41 during one revolution of the crank arm 14. For example, the electronic controller EC1 can be configured to calculate total power during one revolution of the crank assembly 13 by doubling the power INF41 on the only one crank arm.

Figure 19:
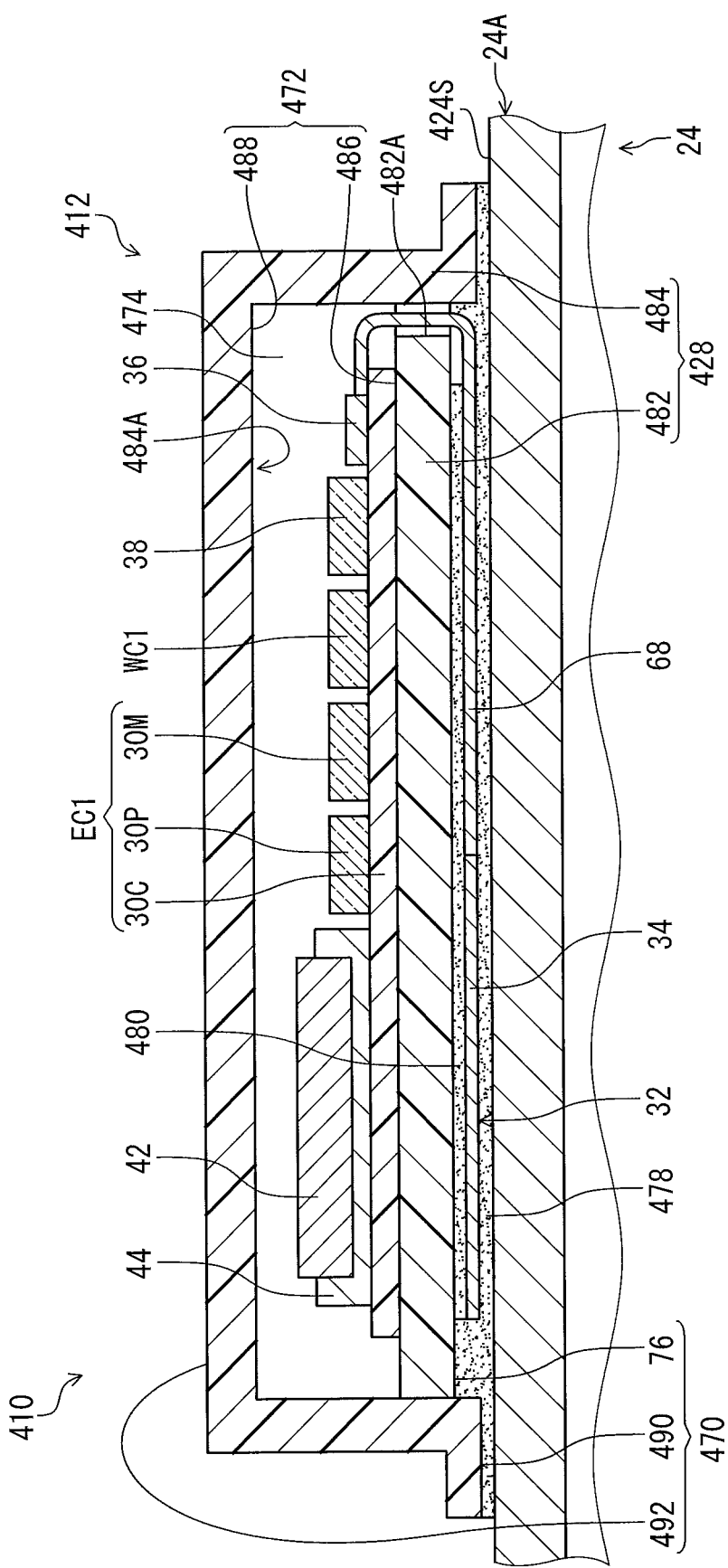
FIG. 19 is a schematic cross-sectional view of the rotational device illustrated in FIG. 16.

As seen in FIG. 19, the electrical device 412 for the rotational device 410 of the human-powered vehicle 2 comprises a housing 428. The housing 428 is coupled to the pedal axle 24A (see e.g., FIG. 17). The housing 428 includes an outer surface 470 and an inner surface 472. The inner surface 472 defines an internal space 474. The housing 428 is configured to be attached to an additional attachment surface 424S of the rotational device 410 with an adhesive agent 478. The outer surface 470 is configured to be attached to the additional attachment surface 424S of the rotational device 410 with the adhesive agent 478. The outer surface 470 includes an attachment surface 476. The attachment surface 476 is configured to be attached to the additional attachment surface 424S of the rotational device 410 with the adhesive agent 478.

In the present embodiment, the pedal axle 24A includes the additional attachment surface 424S. The attachment surface 476 is configured to be attached to the additional attachment surface 424S of the pedal axle 24A with the adhesive agent 478. However, the attachment surface 476 can be configured to be attached to an additional attachment surface of another part of the rotational device 410 with an adhesive agent if needed and/or desired.

The force sensor 32 is attached to the attachment surface 476. The strain gauge 34 is attached to the attachment surface 476. The force sensor 32 is configured to measure the force applied to the rotational device 410 in an attachment state where the attachment surface 476 is attached to the additional attachment surface 424S of the rotational device 410.

The force sensor 32 is attached to the attachment surface 476 with an additional adhesive agent 480. The strain gauge 34 is attached to the attachment surface 476 with the additional adhesive agent 480. The flexible printed circuit 68 is attached to the attachment surface 476 with the additional adhesive agent 480. The flexible printed circuit 68 extends from the force sensor 32 to the circuit board 30C of the electronic controller EC1.

The additional attachment surface 424S has at least one of a flat shape and a curved shape. The attachment surface 476 and the force sensor 32 can be configured to be attached to the additional attachment surface 424S of the rotational device 410 with the adhesive agent 478 in a case where the additional attachment surface 424S has at least one of a flat shape and a curved shape.

The force sensor 32 is provided between the housing 428 and the pedal axle 24A in the attachment state. The force sensor 32 is provided between the attachment surface 476 and the additional attachment surface 424S in the attachment state. The force sensor 32 is entirely provided outside the internal space 474. The flexible printed circuit 68 is partially provided outside the internal space 474. The flexible printed circuit 68 is partially provided in the internal space 474.

The housing 428 includes a base plate 482. The base plate 482 at least partially defines the internal space 474. The base plate 482 includes the attachment surface 476. The base plate 482 partially defines the outer surface 470. The base plate 482 partially defines the inner surface 472. The housing 428 includes a cover 484. The base plate 482 and the cover 484 at least partially define the internal space 474. In the present embodiment, the base plate 482 entirely defines the internal space 474. The base plate 482 and the cover 484 entirely define the internal space 474. However, the base plate 482 can partially define the internal space 474 if needed and/or desired. The base plate 482 and the cover 484 can partially define the internal space 474 if needed and/or desired.

The base plate 482 is coupled to the cover 484. The base plate 482 is fastened to the cover 484 with a fastener such as a screw or an adhesive agent. The base plate 482 includes an opening 482A. The flexible printed circuit 68 extends through the opening 482A. The cover 484 includes a cover recess 484A. The base plate 482 is at least partially provided in the cover recess 484A. The internal space 474 is at least partially provided in the cover recess 484A. In the present embodiment, the base plate 482 is entirely provided in the cover recess 484A. The internal space 474 is entirely provided in the cover recess 484A. However, the base plate 482 can be partially provided in the cover recess 484A if needed and/or desired. The internal space 474 can be partially provided in the cover recess 484A if needed and/or desired.

In the present embodiment, the base plate 482 is a separate member from the cover 484. However, the base plate 482 can be integrally provided with the cover 484 as a one-piece unitary member if needed and/or desired.

The position detector 38 is at least partially provided in the internal space 474. The wireless communicator WC1 is at least partially provided in the internal space 474. The electronic controller EC1 is at least partially provided in the internal space 474. The processor 30P is at least partially provided in the internal space 474. The memory 30M is at least partially provided in the internal space 474. The circuit board 30C is at least partially provided in the internal space 474. The electric power source 42 is at least partially provided in the internal space 474. The power-source holder 44 is at least partially provided in the internal space 474.

In the present embodiment, the position detector 38 is entirely provided in the internal space 474. The wireless communicator WC1 is entirely provided in the internal space 474. The electronic controller EC1 is entirely provided in the internal space 474. The processor 30P is entirely provided in the internal space 474. The memory 30M is entirely provided in the internal space 474. The circuit board 30C is entirely provided in the internal space 474. The electric power source 42 is entirely provided in the internal space 474. The power-source holder 44 is entirely provided in the internal space 474.

However, the position detector 38 can be partially provided in the internal space 474 if needed and/or desired. The wireless communicator WC1 can be partially provided in the internal space 474 if needed and/or desired. The electronic controller EC1 can be partially provided in the internal space 474 if needed and/or desired. The processor 30P can be partially provided in the internal space 474 if needed and/or desired. The memory 30M can be partially provided in the internal space 474 if needed and/or desired. The circuit board 30C can be partially provided in the internal space 474 if needed and/or desired. The electric power source 42 can be partially provided in the internal space 474 if needed and/or desired. The power-source holder 44 can be partially provided in the internal space 474 if needed and/or desired.

The electronic controller EC1 is coupled to the base plate 482. The circuit board 30C is coupled to the base plate 482. The electronic controller EC1 is fastened to the base plate 482 with a fastener such as a screw or an adhesive agent. The circuit board 30C is fastened to the base plate 482 with a fastener such as a screw or an adhesive agent.

The electronic controller EC1 is provided on the inner surface 472. The circuit board 30C is provided on the inner surface 472. In the present embodiment, the inner surface 472 includes a first inner surface 486 and a second inner surface 488. The base plate 482 includes the first inner surface 486. The first inner surface 486 is provided on a reverse side of the attachment surface 476. The cover 484 includes the second inner surface 488. The second inner surface 488 partially defines the internal space 474.

The electronic controller EC1 is provided on the first inner surface 486. The circuit board 30C is provided on the first inner surface 486. However, the electronic controller EC1 can be provided on the second inner surface 488 of the cover 484 if needed and/or desired. The circuit board 30C can be provided on the second inner surface 488 of the cover 484 if needed and/or desired.

The force sensor 32 and the housing 428 are attached to the crank assembly 13 with the adhesive agent 478. The force sensor 32 and the base plate 482 are attached to the crank assembly 13 with the adhesive agent 478. The force sensor 32 and the housing 428 are attached to the pedal axle 24A with the adhesive agent 478. The force sensor 32 and the base plate 482 are attached to the pedal axle 24A with the adhesive agent 478.

The force sensor 32 and the attachment surface 476 are attached to the crank assembly 13 with the adhesive agent 478. The force sensor 32 and the attachment surface 476 are attached to at least one of the pedal axle 24A and the pedal body 24B with the adhesive agent 478. The strain gauge 34 and the attachment surface 476 are attached to the crank assembly 13 with the adhesive agent 478. The strain gauge 34 and the attachment surface 476 are attached to the pedal axle 24A with the adhesive agent 478. However, the force sensor 32 and the attachment surface 476 can be attached to another part of the crank assembly 13 (e.g., the crank axle 16, the crank arm 18) with the adhesive agent 478 if needed and/or desired.

The force sensor 32 is configured to be at least partially provided in the adhesive agent 478. The force sensor 32 is at least partially provided in the adhesive agent 478 in the attachment state. The flexible printed circuit 68 is configured to be at least partially provided in the adhesive agent 478. The flexible printed circuit 68 is at least partially provided in the adhesive agent 478 in the attachment state. In the present embodiment, the force sensor 32 is configured to be entirely provided in the adhesive agent 478. The flexible printed circuit 68 is configured to be partially provided in the adhesive agent 478. However, the force sensor 32 can be configured to be partially provided in the adhesive agent 478 if needed and/or desired. The flexible printed circuit 68 can be configured to be entirely provided in the adhesive agent 478 if needed and/or desired.

The force sensor 32 is in contact with the adhesive agent 478 in the attachment state. The strain gauge 34 is in contact with the adhesive agent 478 in the attachment state. The flexible printed circuit 68 is in contact with the adhesive agent 478 in the attachment state. The attachment surface 476 is in contact with the adhesive agent 478 in the attachment state.

The force sensor 32 is in contact with the additional adhesive agent 480 in the attachment state. The strain gauge 34 is in contact with the additional adhesive agent 480 in the attachment state. The flexible printed circuit 68 is in contact with the additional adhesive agent 480 in the attachment state.

The outer surface 470 includes a first outer surface 490 and a second outer surface 492. The cover 484 includes the first outer surface 490 and the second outer surface 492. The first outer surface 490 is attached to the additional attachment surface 424S with the adhesive agent 478. The first outer surface 490 is in contact with the adhesive agent 478 in the attachment state. The second outer surface 492 is provided on a reverse side of the second inner surface 488 of the inner surface 472.

The electrical device 412 can be at least partially provided to at least one of the pedal axle 24A and the pedal body 24B. In a case where a part of the electrical device 412 is provided to the pedal axle 24A and the remaining part of the electrical device 412 is provided to the pedal body 24B, for example, an electric part provided to the pedal axle 24A is electrically connected to an electric part provided to the pedal body 24B via a rotating contact. The electrical device 412 can be provided to the pedal 26 if needed and/or desired. In such embodiments, the force sensor 32 and the attachment surface 476 are attached to at least one of the pedal axle 26A and the pedal body 26B with the adhesive agent 478.

The description regarding the electrical device 12 can be utilized as the description regarding the electrical device 412 by replacing the reference numerals "INF1," "INF11," "INF12," "10," and "12" with "INF4," "INF41," "INF42," "410," and "412." Thus, the description regarding the stopping of the wireless transmission of the rotational information INF4 will not be described in detail here for the sake of brevity.

In the first to fourth embodiments and the modifications thereof, the external electrical device 8 is a separate device from the additional electrical device 6. However, the external electrical device 8 can be integrally provided with the additional electrical device 6 as a single device if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electrical device for a rotational device of a human-powered vehicle, comprising:
   a housing including
      an outer surface including an attachment surface configured to be directly attached to an additional attachment surface of the rotational device with an adhesive agent in an attachment state, and
      an inner surface defining an internal space; and
   a force sensor attached to the attachment surface, the force sensor being configured to be directly attached to the additional attachment surface with the adhesive agent in the attachment state, the force sensor being configured to measure a force applied to the rotational device in the attachment state.

2. The electrical device according to claim 1, wherein the force sensor is entirely provided outside the internal space.

3. The electrical device according to claim 1, wherein the housing includes a base plate at least partially defining the internal space, and
   the base plate includes the attachment surface.

4. The electrical device according to claim 3, wherein the base plate partially defines the outer surface, and
   the base plate partially defines the inner surface.

5. The electrical device according to claim 1, further comprising
   a position detector at least partially provided in the internal space and configured to detect a rotational position of the rotational device.

6. The electrical device according to claim 1, further comprising
   a wireless communicator at least partially provided in the internal space and configured to wirelessly communicate with an additional wireless communicator of an additional electric device.

7. The electrical device according to claim 1, further comprising
   an electronic controller at least partially provided in the internal space and electrically connected to the force sensor.

8. The electrical device according to claim 7, further comprising
   a flexible printed circuit electrically connecting the force sensor and the electronic controller.

9. The electrical device according to claim 1, wherein the force sensor includes a strain gauge attached to the attachment surface.

10. The electrical device according to claim 1, wherein the housing includes a base plate,
    the housing includes a cover, and
    the base plate and the cover at least partially define the internal space.

11. The electrical device according to claim 1, wherein the force sensor is configured to be at least partially provided in the adhesive agent.

12. A rotational device for a human-powered vehicle, comprising:
    a crank arm; and
    the electrical device according to claim 1,
    the force sensor and the attachment surface being attached to the crank arm with the adhesive agent.

13. The rotational device according to claim 12, wherein the force sensor is at least partially provided in the adhesive agent.

14. The rotational device according to claim 12, further comprising:
    a crank axle; and
    a sprocket, wherein
    the crank arm is secured to the crank axle.

15. The rotational device according to claim 14, wherein the electrical device is at least partially provided to at least one of the crank axle, the crank arm, and the sprocket.

16. A rotational device for a human-powered vehicle, comprising:
    a pedal axle;
    a pedal body rotatably coupled to the pedal axle; and
    the electrical device according to claim 1,
    the force sensor and the attachment surface being attached to at least one of the pedal axle and the pedal body with the adhesive agent.

17. The rotational device according to claim 16, wherein the force sensor is at least partially provided in the adhesive agent.

18. The rotational device according to claim 16, wherein the electrical device is at least partially provided to at least one of the pedal axle and the pedal body.

19. The electrical device according to claim 1, wherein the force sensor is attached to the attachment surface with an additional adhesive agent.

20. An electrical device for a rotational device of a human-powered vehicle, comprising:
a housing including
an outer surface including an attachment surface configured to be attached to an additional attachment surface of the rotational device with an adhesive agent, and
an inner surface defining an internal space; and
a force sensor attached to the attachment surface and configured to measure a force applied to the rotational device in an attachment state where the attachment surface is attached to the additional attachment surface of the rotational device, wherein
the housing includes a base plate including the attachment surface,
the housing includes a cover including a first outer surface configured to be adhered to the additional attachment surface of the rotational device in the attachment state,
the base plate and the cover at least partially define the internal space,
the attachment surface being recessed in relation to the first outer surface to form a recessed area, and
the force sensor is at least partially provided within the recessed area.

* * * * *